United States Patent [19]

Acosta et al.

[11] 4,212,553

[45] Jul. 15, 1980

[54] TABULATION CONTROL SYSTEM HAVING TWO ELECTRONIC TAB RACKS

[75] Inventors: Robert G. Acosta; Michael E. McBride, both of Austin; Robert A. Pascoe, Round Rock, all of Tex.

[73] Assignee: International Business Machines Corporation, Armonk, N.Y.

[21] Appl. No.: 884,082

[22] Filed: Mar. 6, 1978

[51] Int. Cl.² ........................................... B41J 25/18
[52] U.S. Cl. ...................... 400/279; 400/76; 364/200; 364/900
[58] Field of Search ...................... 400/61, 62, 63, 64, 400/74, 76, 279, 280, 281, 282; 364/200, 900; 340/173 R

[56] References Cited

U.S. PATENT DOCUMENTS

| | | | |
|---|---|---|---|
| 3,611,308 | 10/1971 | Grinnell | 400/280 X |
| 3,832,697 | 8/1974 | Kashio | 400/279 X |
| 3,833,892 | 9/1974 | Marsalka et al. | 364/900 |
| 3,915,278 | 10/1975 | Spence et al. | 400/64 |
| 3,927,395 | 12/1975 | Kashio | 400/280 X |
| 3,952,852 | 4/1976 | Greek et al. | 400/279 |
| 3,996,569 | 12/1976 | Saunders | 340/173 R |
| 3,999,164 | 12/1976 | Kashio | 400/279 X |
| 4,032,900 | 6/1977 | Kashio | 364/200 |
| 4,045,780 | 8/1977 | Kashio | 400/279 X |
| 4,086,660 | 4/1978 | McBride | 364/900 |

OTHER PUBLICATIONS

IBM Technical Disclosure Bulletin, "Variable Left Margin with Counter Control," Hobgood et al., vol. 10, No. 2, Jul. 1967, pp. 109, 110.
IBM Technical Disclosure Bulletin, "Format Control," Austin et al., vol. 12, No. 3, Aug. 1969, p. 438.
IBM Technical Disclosure Bulletin, "Electronic Tab Rack and Tab Table Formatting," Byram, vol. 14, No. 3, Aug. 1971, p. 813.

*Primary Examiner*—Ernest T. Wright, Jr.
*Attorney, Agent, or Firm*—James H. Barksdale, Jr.

[57] ABSTRACT

A system having two tab racks for controlling playout of sequentially stored text columns in a side-by-side format. During input keying set up of a job, desired tabs are set in a text tab rack and stored in a text buffer along with the text. These tabs will be in control for following keyed text. If new or additional tabs are required to define column boundaries during later playout, they are keyed, set, and stored prior to the text for the columns. In any event, the tabs in effect at the beginning of input keying of the columnar job will be in control for the column text. Upon later playout from the buffer and when the beginning of the first column is reached, a copy of the tabs set in the text tab rack is transferred to a column tab rack to control the column boundaries. If different tabs are required for the text in the columns, they must have been stored in the buffer after the beginning of the first column or playout must be interrupted for input keying of these tabs.

10 Claims, 31 Drawing Figures

TABULATION CONTROL SYSTEM HAVING TWO ELECTRONIC TAB RACKS

DESCRIPTION

Background of the Invention

1. Field of the Invention

This invention generally relates to a system for controlling the output side-by-side playout of columns which have been sequentially stored in a buffer. More specifically, this invention relates to controlling both text and column tabulation during columnar playout.

2. Description of Prior Art (Prior Art Statement)

Representative of the closest known prior art are U.S. Pat. No. 3,952,852; the IBM Electronic "Selectric"* Composer; and U.S. patent application Ser. No. 680,562, filed Apr. 27, 1976, having Michael E. McBride as inventor and entitled Automatic Format Control for Text Printing System, now U.S. Pat. No. 4,086,660 issued Apr. 25, 1978. ≢*Registered Trademark, International Business Machines Corporation.

In U.S. Pat. No. 3,952,852 a system is disclosed having basically a keyboard and printer, a buffer and control, and a multi-column playout control unit. During setup for input keying, a beginning of memory code is stored in the buffer. Also, since the input printer is the same as the output printer, a tab field is set up for defining the column locations. For columns which are to be keyed and stored sequentially, but printed out in a side-by-side manner, the beginning of each column is defined by the keying and storage of a column begin code. Following each column begin code, the text for each column is keyed and stored in its entirety. At the end of the last column to be printed out in a side-by-side relationship, a column end code is keyed and stored. Upon playout from the buffer, the buffer memory established as described above is scanned when a column begin code is encountered. An operation flag is inserted into the buffer memory after the first column begin code. After each column begin code except the first, a column marker code is inserted and scan continues. Upon detection of the column end code, scanning continues to the beginning of memory. When the operation flag is again detected, following characters and spaces are printed out until a carrier return is detected. The operation flag is advanced beyond the carrier return code, the printer is caused to tab rather than to return the carrier to the left margin, and a column advance operation is performed. This causes a column marker code to be written over the operation flag, and a scan of memory. The next detected column marker code is written over with a new operation flag. Printout then continues beginning at the point of the new operation flag until a carrier return is detected. The playout operations described continue until the end of each column is reached. After printout of all columns, the column marker codes are flushed from memory.

From the above, the side-by-side printout of sequentially stored text is fully disclosed, but distinctions between tabs controlling text and tabs controlling column boundaries have not been addressed.

Consider next the IBM Electronic "Selectric" Composer. This system is capable of performing a side-by-side printout of sequentially stored columns. A tab field made up of set tabs is established during input keying to define the beginning position of each column. However, there is no readily utilizable and totally workable capability of handling the situation where additional tabs are necessary to format text within the columns. If additional tabs are set, they may overlap into or beyond the areas between the columns, and cause misalignment of columns upon playout. That is, in this composer system consider a tab set between the right margin of one column and the left margin of the next column. In this case, carrier escapement associated with a column advance operation to the next column will result in the carrier being positioned at the in-between tab to begin printing the next column. The result is misalignment of the next column. There are two known techniques of overcoming this problem. One is for the operator to terminate playout and clear and set tabs as the need arises. The other is to format text assuming all tabs are fixed. Either would be an extremely time consuming and tedious chore.

Based on the above, the IBM Electronic "Selectric" Composer is not capable of being efficiently utilized when both column and text tabs are considered.

In the above-referenced McBride patent application, an automatic system is disclosed for controlling format during playout of a job made up of a number of pages recorded on a number of magnetic cards. At the beginning of a job and upon input keying, format information is keyed and stored in a text buffer. The format information is made up of tab set locations, measure length, index values, adjust modes, etc. For format changes prior to recording on a magnetic card, new format information is keyed and stored in the text buffer along with keyed text. Upon recording the text and format information on a card, the format information last in effect is transferred to a format buffer to control format until changed. Likewise, for later playout of text stored on magnetic cards, the format information last in effect will control format until changed.

This prior art is relevant in that different format lines containing tab setting information can be keyed and stored as the need arises to control following text. To handle text and column tabs during columnar playout though, many format lines may be required. Also, the operator will have to remain alert in order to key these format lines at the proper locations in the text. In the instant application, two tab racks are utilized and the number of format lines is minimized.

In summary, the above described art is relevant to varying degrees, but falls short of either anticipating or rendering the subject invention obvious. More specifically, the subject invention presents an advance over the prior art in terms of a system having two tab racks and structured to effect a side-by-side playout of sequentially stored columns having both text and column tab format requirements. Some of the more important advantages of such a system are that operator confusion and coding during input keying are minimized. Also, the chances of column misalignment are substantially reduced.

U.S. Pat. Nos. 3,611,308; 3,832,697; 3,833,892; 3,915,278; 3,927,395; 3,996,569; 3,999,164; and 4,032,900, and IBM Technical Disclosure Bulletins Vol. 10, No. 2, July 67, pages 109 and 110; Vol. 12, No. 3, August 69, page 438; and Vol. 14, No. 3, August 71, page 813 were also considered during preparation of this application. None of this prior art is considered any more pertinent than that described above.

SUMMARY OF THE INVENTION

A system is provided having basically a keyboard, a printer, a buffer and control, a multi-column playout control, an output format control, and two electronic tab racks. During input keying, a beginning of memory code is stored in the buffer. Prior to input keying of columns, a tab format line, including tabs for defining the left margins of each column after the first, is keyed and stored in the buffer and tab stops are set in a text tab rack. This is if a tab format line has not already been keyed for controlling following columns. The beginning of the first column is then defined by keying and storing a column begin code. Another tab format line is keyed and stored to control following text. Tab stops in the text tab rack are updated in accordance with this format line. Thereafter, column mode and measure codes are keyed. If subsequent columns or sections of columns are to have different modes or measures, additional mode and measure codes will be keyed and stored along with the columns concerned. Following the keying and storage of mode and measure codes, the text for the first column is keyed and stored in its entirety. For each subsequent column, a column begin code is keyed and stored, and followed by any necessary mode and measure codes and the column text. At the end of the last column to be printed out in side-by-side relationship, a column end code is keyed and stored in the buffer. During later playout when the first stored tab format line is encountered during a buffer memory scan operation, tab stops defined thereby are set in the text tab rack. When a column begin code is encountered, a copy of the contents of the text tab rack are automatically transferred to a column tab rack. When the format line following the column begin code is encountered, the text tab rack is updated and tab stops defined thereby are set in the text tab rack to control text within the columns. The tab stops set in the column tab rack control the left margin locations of each column after the first. An operation flag is inserted into the buffer memory after the first column begin code. The memory scan operation continues and after each column begin code except the first, a column marker code is inserted into memory and scanning continues. Upon detection of the column end code, scanning continues to the beginning of memory. When the operation flag is again detected, following characters and spaces are printed out in the defined mode until a carrier return is detected. If any tab codes are encountered during the playout prior to detection of a carrier return code, the printer carrier is caused to escape for the tab. The text tab rack is addressed for the tab escapement. Once the carrier return code is encountered and there exists a subsequent column, the printer carrier is caused to escape through tabbing rather than return to the left margin. For this tab operation the column tab rack is addressed for the tab escapement. The left margin of the page is utilized as a reference in determining escapement for a column tab operation during playout. For a text tab operation during playout, the left margin of the column being printed is utilized as a reference in determining escapement. After the column tab operation, a column advance operation is performed. A column marker code is written over the operation flag, and the memory is scanned. The next detected column marker code is written over with a new operation flag. Printout then continues until a carrier return code is detected. If this carrier return is in the last column, the carrier is returned to the left margin and a column advance operation is performed to advance to the first column. The printout and column advance operations continue until all text from all columns has been printed. After printout of all columns, the column marker codes are flushed from memory.

From the above, format lines can be keyed and stored with the text during input keying. This will result in the text tab rack being updated for each format line. Also, playout can be interrupted for keying and setting of tabs in the text tab rack. Further, the text tab rack will be updated upon reading a format line from memory during playout. The loading of the column tab rack is by the system upon encountering the first column begin code during playout.

DESCRIPTION OF THE PREFERRED EMBODIMENT

Operations to be Performed

Figure 1:
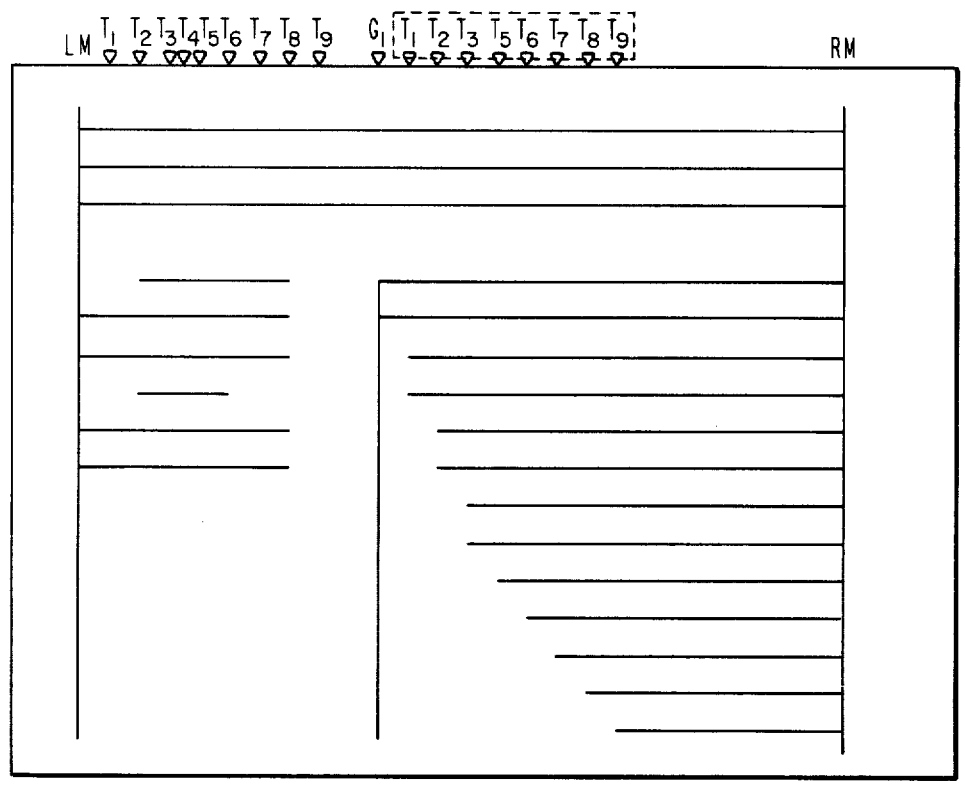
FIG. 1 illustrates a desired output format including columns of text aligned side-by-side.

For a more detailed description of the invention, reference will first be made to those figures of the drawing which illustrate the operations to be performed in terms of both memory arrangement and playout.

Referring first to FIG. 1, there is shown a desired output format. All text is justified within defined measures. There are three sections of text. The first includes the first three lines which are to be justified within the measure defined by the left and right margins LM and RM, respectively. The second is the left or first column which contains six lines. This column requires tab settings $T_2$ and $T_4$. $T_2$ is the indent level for the first line. $T_4$ is the centering point for the fourth line. The third section is the right or last column which contains thirteen lines. This column requires the eight tab settings $T_1$, $T_2$, $T_3$, $T_5$, $T_6$, $T_7$, $T_8$, $T_9$, in addition to tab setting $G_1$ to define the left margin of the second column during playout. These eight tab settings are shown again and in the hatched block above the right column for purposes of clarity. In actuality, they will only exist as shown above the left column. This is because the text is keyed sequentially as shown in FIG. 2.

Figure 2:
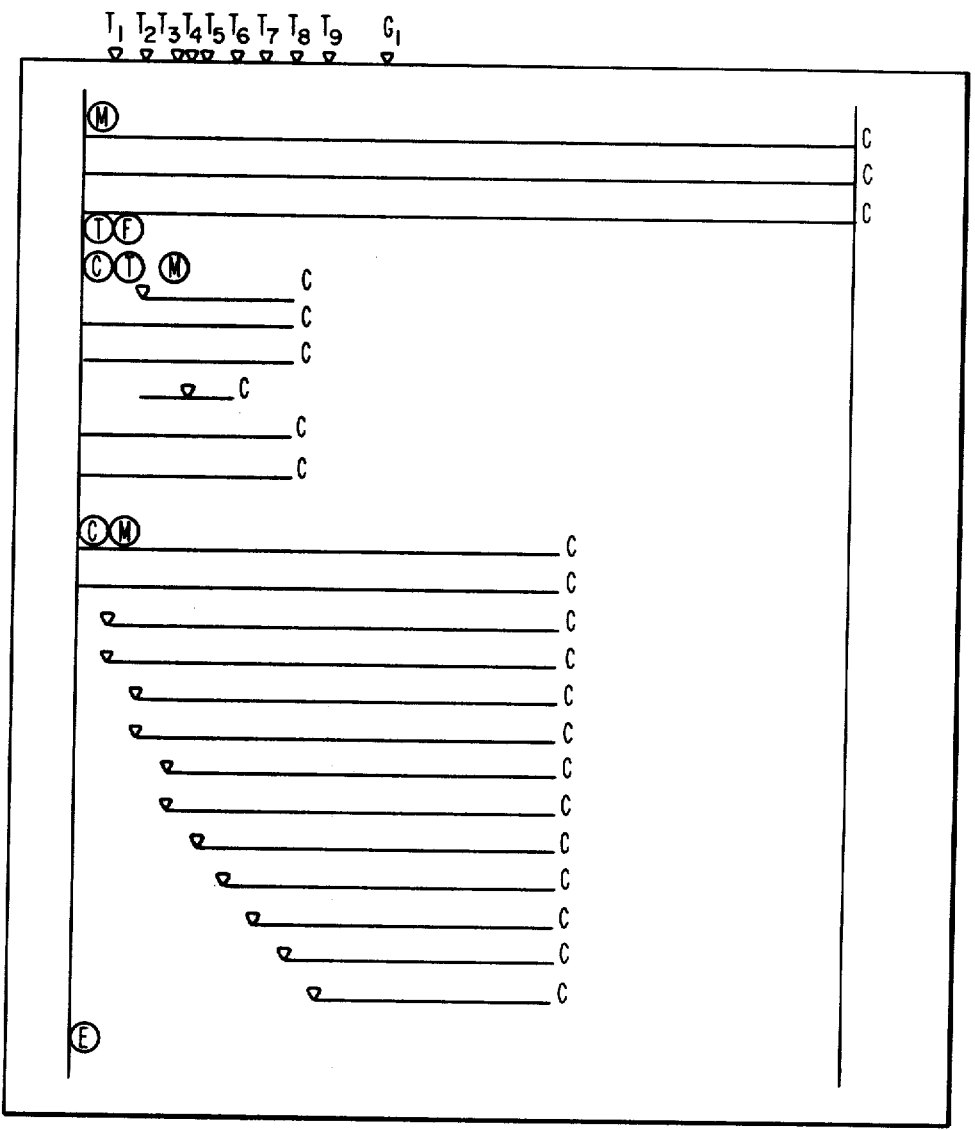
FIG. 2 is a pictorial representation of a buffer stored text and control code memory arrangement utilized for obtaining the desired format shown in FIG. 1 upon playout.

Refer next to FIG. 2. In this figure is shown a memory arrangement corresponding to an operator input keying sequence. Also shown are the tab settings established by the operator. The memory arrangement is stored in the text and control code buffer. The tab settings are also stored in the buffer in the form of a format line. During input keying, the operator will cause the carrier to escape to each desired tab stop and depress a tab set button. This will cause tabs to be set in a text tab rack which can be a random access memory. In fact, both tab racks utilized in this system can be random access memories. Each time the tab set button is depressed, a tab location will be stored in memory. The stored tab set locations make up the tab format line. As will become more clearly apparent later herein, column tabs such as $G_1$ have no bearing on text columns keyed during input keying. This is because the columns are stored sequentially.

The following is a glossary of the symbols both representing codes stored in memory and used for simplification of the following description.

T represents a tab format line made up of tab set locations
C represents a column begin code
E represents a column end code
F represents an operation flag (referred to alternatively as flag)
X represents a column marker code
C represents a carrier return code
M represents mode-measure codes The solid lines represent text character and space codes and printed characters and spaces ∇ represents a tab point at the beginning of a line. This is referred to as a tab carrot in the following description.

It is to be pointed out that, although printing will occur during input keying, the printed page will not exactly correspond to the pictorial representation of memory shown in FIG. 2. This is because the flag, mode-measure, column begin, column end, tab format and end of memory codes are stored in memory, but not printed. Also, since the same input/output device is used for inputing keying, printing, and storage, as will be used for output printing, the operator will set the left and right margins as shown in FIG. 1. Also, it is to be assumed that in the page buffer the beginning of the page is marked by a beginning of memory code and the end of the page being marked by an end of memory code. During input keying, the operator can key the beginning of memory code or it can be input into memory by the system. In any event, this is considered to be no part of this application or invention. The operation flag code shown following the first tab format line is the operating point and will be addressing the next character or code in memory to be operated upon at any particular time. The justify or mode code is input by operator keying. The same is the case with the measure code.

With the mode and measure defined at the beginning of the page, the operator will begin keying text from the left margin and when the right margin is approached and an acceptable line ending is reached, a carrier return will be keyed. The carrier will be returned to the left margin. The platen of the printer will then be indexed and the second line will be keyed followed by a carrier return. This operational sequence is repeated for the third line. The mode-measure pair preceding these first three lines establishes the mode and measure for these three lines and will continue in effect in the absence of subsequent mode and measure pairs.

Before keying the first column begin code, the operator stores a tab format line through input keying. This is primarily for defining the location of column tab $G_1$. As pointed out, the system has two tab racks. One is a text tab rack and the other a column tab rack. Upon input keying, $G_1$ is stored in the text tab rack. The first column begin code is then keyed and followed by a second tab format line. The keying of a format line results in a clearing of previous tabs and the storing of new tabs in the text tab rack. $G_1$ is cleared from the text tab rack, but the tab format line defining it remains stored with the text in memory. Tab locations for tabs $T_1$-$T_9$ are defined upon keying the second format line and these tabs are set in the text tab rack. The operator proceeds to key the mode, measure, and text for the two columns. Then a column end code is keyed.

Figure 4:
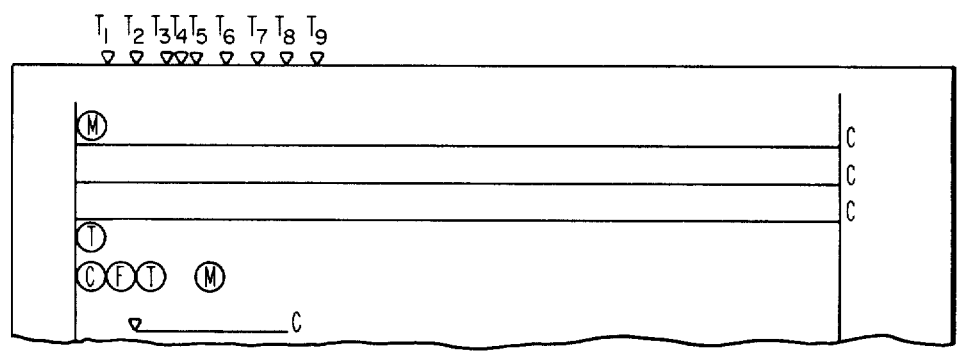
FIG. 4 is a pictorial representation of the memory at the time text tabs are to be set for following columns.
Figure 3:
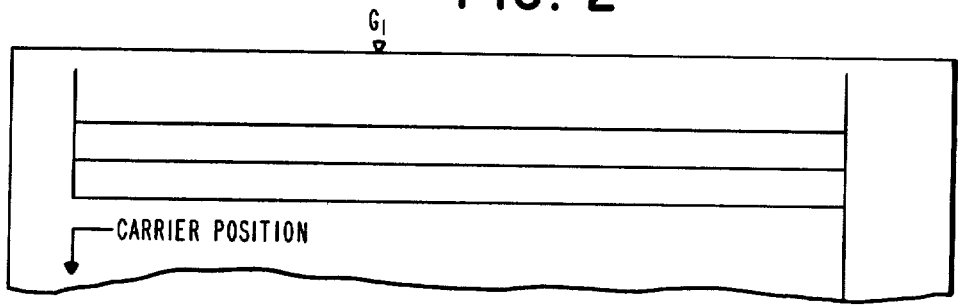
FIG. 3 illustrates the printed page and printer carrier position following printout of the first three text lines from the memory shown in FIG. 2.

As shown in FIG. 2, the operation flag is addressing the first column begin code which defines the beginning of the first column. At this time during playout, the printer carrier will be positioned at the left margin as shown in FIG. 3. The first three lines have already been printed in a justified format. When the operation flag addresses the first column begin code upon playout, the contents of the text tab rack are transferred to the column tab rack. That is, $G_1$ is transferred to the column tab rack. With the memory corresponding to FIG. 2 and the printed page and carrier position corresponding to that illustrated in FIG. 3, a scan operation is performed and column marker codes are inserted into the memory following each column begin code except the first. When the operation flag is advanced and addresses the second format line, the text tab rack is loaded with tabs $T_1$-$T_9$. FIG. 4 illustrates the memory arrangement at this time.

Figure 5:
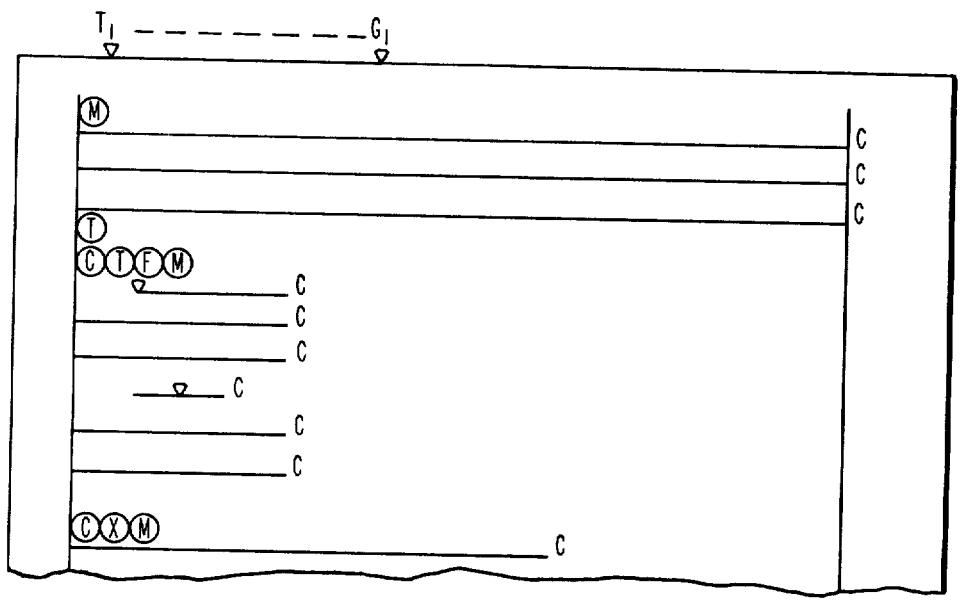
FIG. 5 is a pictorial representation of the memory at the time the mode and measure is to be set for the first column of text.

The operation flag is then advanced to a position addressing the mode-measure codes. This and the previously inserted column marker codes are illustrated in FIG. 5. The column mode and measure are set and the flag is again advanced. Playout of the first line of the first column is now ready to begin.

The term playout used herein is meant to include system operations such as column advance, scan, etc., including the actual printout of a line. The term printout is meant to include actual printing operations which begin, for example, when the operation flag code addresses the beginning of a line, and end when the operation flag is advanced beyond the carrier return code at the end of a line.

With both the column and text tab racks setup for use by the printer during playout, the position of the carrier can be tracked with respect to both the left margin of the first column and the left margin of the particular column being printed. The left margin of the first column in this application is the left margin of the page. At any time during playout that a tab code is encountered, there will be a comparison of the carrier position within the column and the text tab rack to perform the tab operation.

Figure 6:
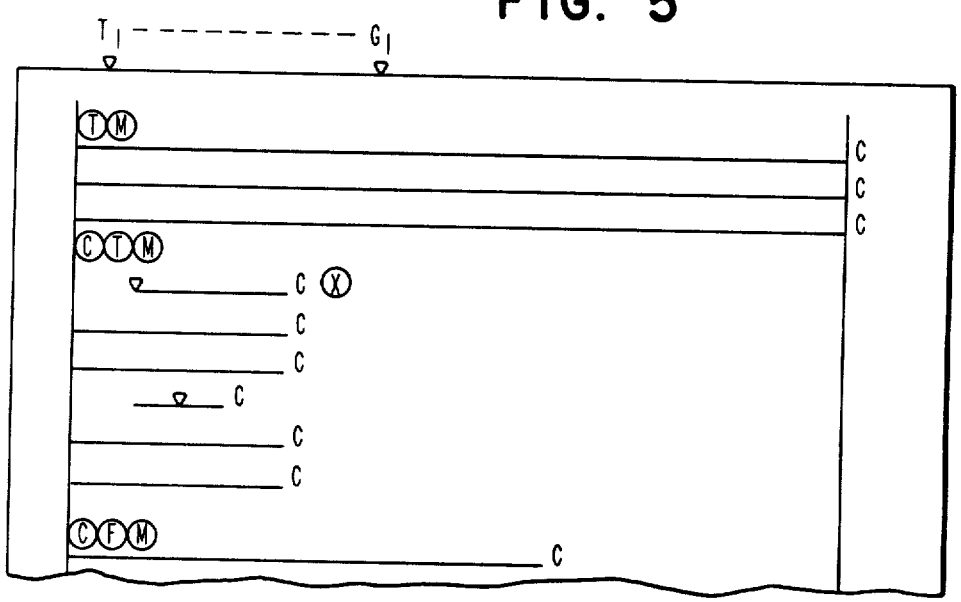
FIG. 6 is a pictorial representation of the memory after printout of the first line of the first column.
Figure 7:
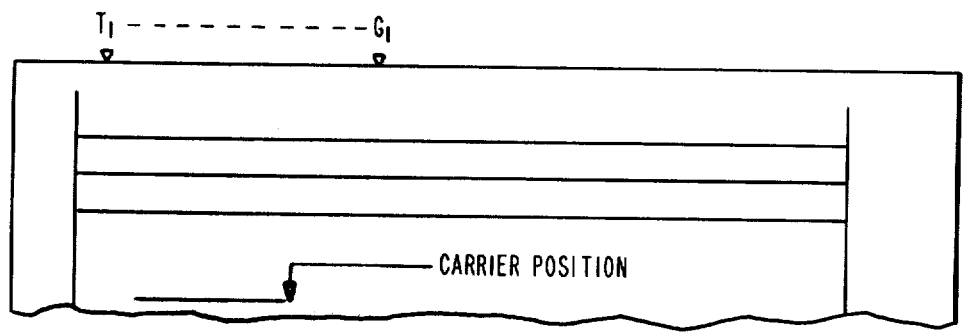
FIG. 7 depicts the printed page and carrier position after printout of the first line of the first column.

Referring next to FIG. 6, there is shown a pictorial representation of the memory arrangement following playout of the first line of the first column. The carrier will be positioned as shown in FIG. 7 with the first line of the first column having been printed. A column marker code has been written over the operation flag at the end of the first line and the beginning of the second line of the first column. A column advance operation has been performed and the next column marker code has been written over with a new operation flag. Before printout can begin in the second column, the carrier must be repositioned to the left margin for this column. The printer is caused to tab to the next tab stop in the column tab rack. This tab stop is $G_1$. This is upon a comparison of the carrier position with respect to the overall left margin and the column tab rack.

Referring again to FIGS. 2, 5, and 6, the tab format line coding is illustrated differently. In FIGS. 2 and 5 no tabs have been set for the first three lines to be printed between the left and right margins. In FIG. 6 the tab $G_1$ was established at the beginning of the job and precedes the mode-measure codes for the first three lines. This could have been for a case where the operator had made an early determination as to the location of the column tab. As far as this application is concerned, the location of the tab format line for $G_1$ is not important as long as it precedes the first column begin code.

As can be appreciated at this point, if all the tab settings were contained in one common tab rack, the printer would tab to position $T_9$ and not $G_1$ for printing the second column. Thus, the second column would be mislocated. $T_9$ is stored to accommodate the last line of the second column. Refer to this line and the hatched block containing $T_9$ in FIG. 1. After the carrier is positioned at $G_1$, playout will begin for the first line of the second column.

Figure 8:
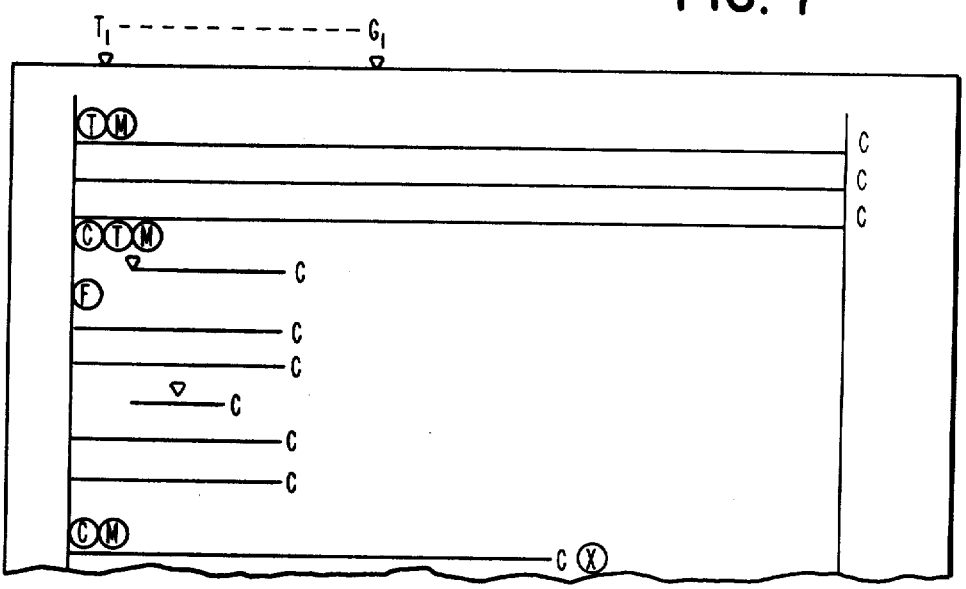
FIG. 8 represents the memory arrangement prior to printout of the second line of the first column.
Figure 9:
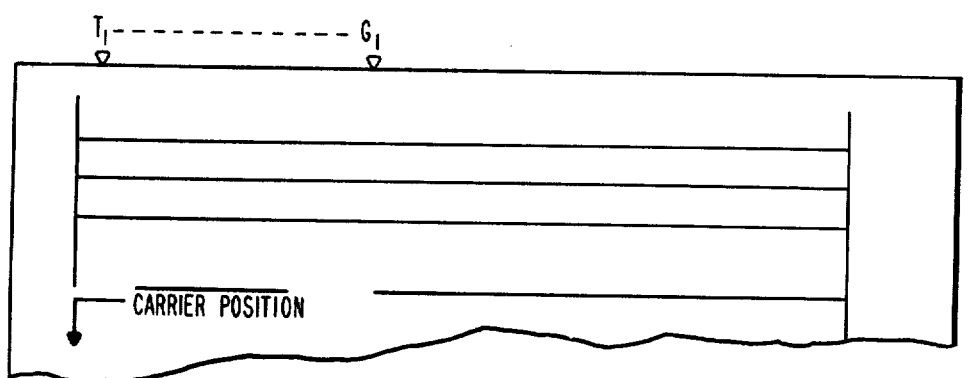
FIG. 9 illustrates the printed page and carrier position following printout of the first line of the second column.

Following printout of the first line of the last (right) column, the operation flag will follow the carrier return and a column marker code is substituted therefore. Upon the next column advance, the operation flag is effectively advanced to the beginning of the second line of the first column and substituted for the column marker code. In actuality, a column marker is written over the operation flag and a new operation flag is written over the next column marker. Therefore, FIG. 8 is an illustration of the memory arrangement following the printout of the first line of the last column and a column advance to the second line of the first column. The carrier will be positioned as shown in FIG. 9.

Figure 10:
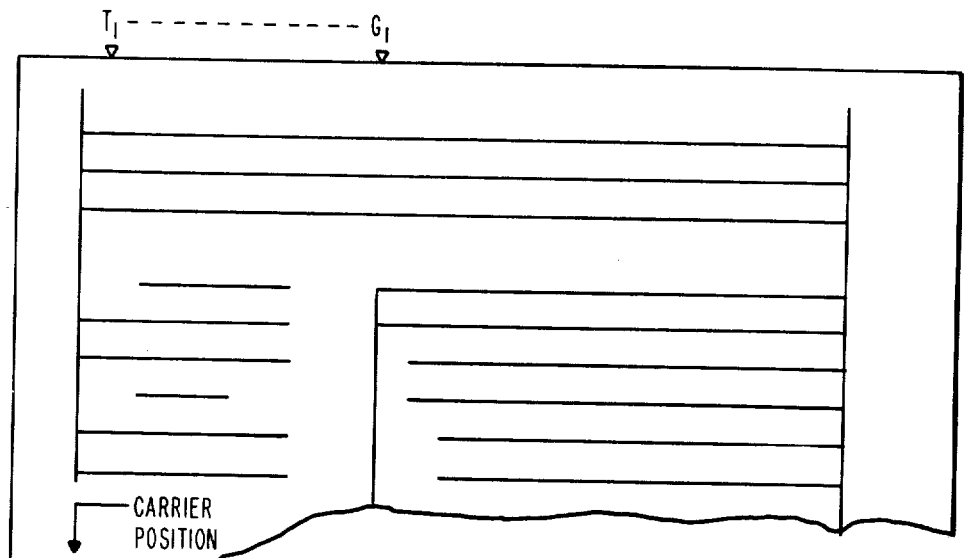
FIG. 10 illustrates the printed page and printer carrier position following printout of the sixth line of the second column.
Figure 11:
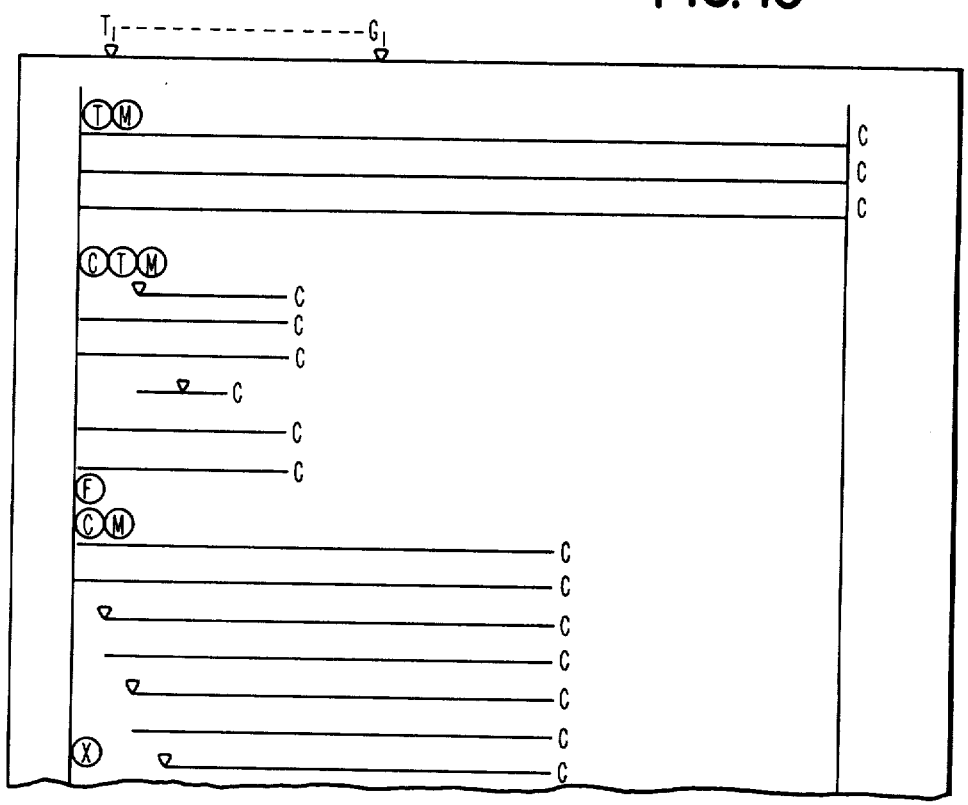
FIG. 11 is a representation of the memory following printout of the sixth line of the second column.
Figure 12:
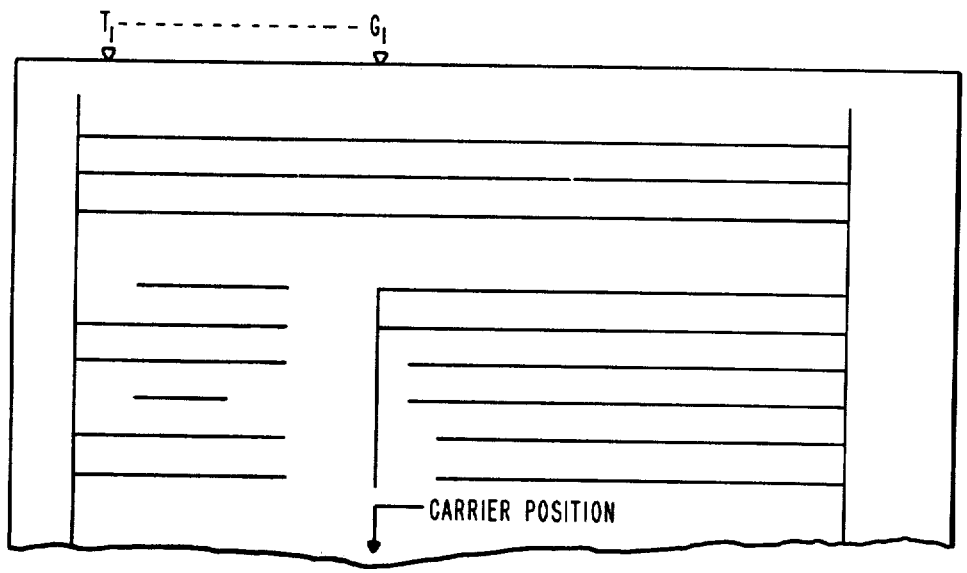
FIG. 12 depicts the printed page and carrier position prior to printout of the seventh line of the second column.
Figure 13:
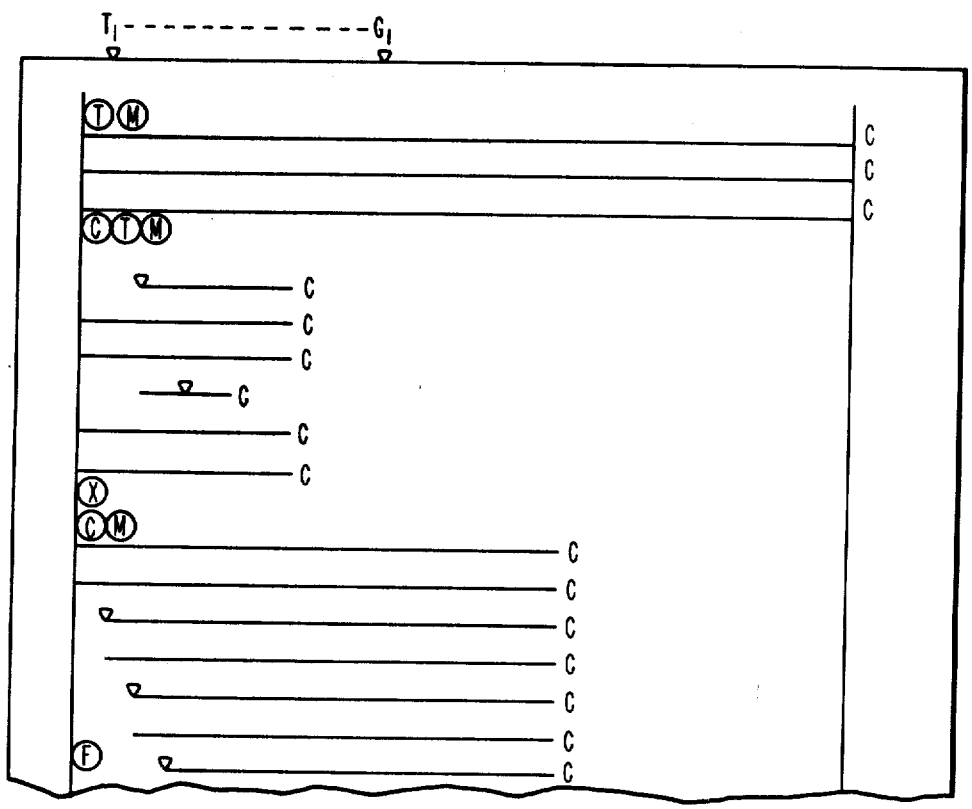
FIG. 13 is a pictorial representation of the memory prior to printout of the seventh line of the second column.

FIGS. 10 and 11 illustrate the carrier position and memory image, respectively, following playout of the sixth line of the second column. Since the operation flag is addressing the second column begin code, there is no more text to be printed in the first column. A column advance operation is performed and the printer carrier is caused to tab to the tab stop $G_1$. FIGS. 12 and 13 illustrate the printed page, carrier position, and memory arrangement following the column advance operation to advance the operation flag to the beginning of the seventh line of the right column.

From the above, carrier escapement during a column advance operation is to tab $G_1$ and not to any one of tabs $T_1$-$T_9$.

The tab carrots shown associated with various of the lines of text represent the point to which the carrier is to be escaped through tabbing prior to printing characters and spaces for the lines. For the first line of the first column, the carrier is to be tabbed to the $T_2$ position before printing characters and spaces. In this case, two tab codes would be keyed during input keying and stored in memory at the beginning of the line. In effect, these two tabs control the indent level of the line. The tab carrot shown in the middle of the fourth line of the first column is the point about which the line is to be centered.

With printout ready to begin for the seventh line of the right column, tabs stored in memory to control the indent level are encountered. The text tab rack is now in control. The result is carrier escapement for the first tab read to $T_1$, for the second tab to $T_2$, and for the third tab read to $T_3$. Once the tab operation for $T_3$ is performed, the remainder of the line can be printed, expanding the spaces as necessary to justify the text between the tab stop $T_3$ and the right margin.

Once all text has been printed from all columns, the column markers are deleted and the printed page will appear as in FIG. 1.

Having briefly described above the operations to be performed, a detailed description of the structure for performing these operations is set out below.

OVERALL SYSTEM STRUCTURE

Figure 14:
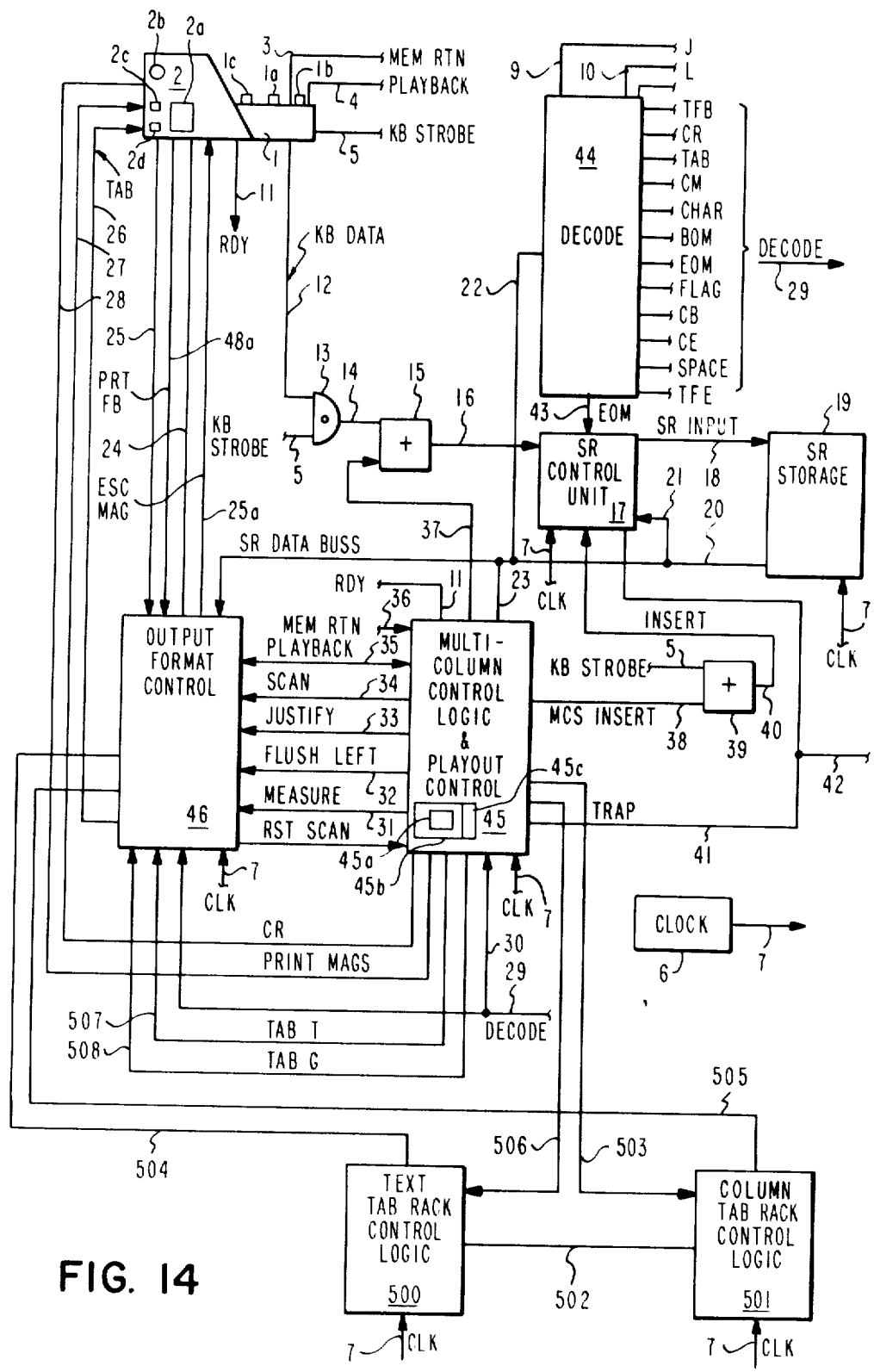
FIG. 14 is an overall block diagram illustrating the structure according to this invention for accomplishing the side-by-side printout of columns under the control of both a text tab rack and column tab rack.

Referring next to FIG. 14, there is shown a keyboard 1 and a printer 2 in the upper left hand corner. Printer 2 has a carrier 2a and a platen 2b. The output of keyboard 1 is along a memory return line 3, a playback line 4, a keyboard strobe line 5, and a keyboard data line 12. An output along keyboard strobe line 5 is a timing signal indicating the presence of data (character or control code) on keyboard data line 12. Although line 12 has been represented as a single line, it is to be appreciated that there are as many lines as are required to make up a character byte. This is also the case for other single lines which carry data as opposed to signals. Data which is keyed on keyboard 1 and appears on data line 12 is applied to AND gate 13. Upon the occurrence of keyboard strobe along line 5, the data is gated through AND gate 13 and along line 14 to OR gate 15. The data is then output along line 16 to a shift register control unit 17. Data input to shift register control unit 17 along line 16 is output along shift register input line 18 to shift register 19 for storage. Shift register control unit 17 controls the input of data into shift register 19 in a known manner.

The system timing of shift register control unit 17, shift register 19, output format control 46, multi-column control logic and playout control 45, text tab rack control logic 500, and column tab rack control logic 501 is provided by the output of clock 6 along line 7. As far as the inputs to shift register 19 are concerned, all are considered data. This will include the mode codes as well as other control codes and characters described above in conjunction with FIGS. 1-13. The data output from shift register 19 is applied along a shift register data buss made up of lines 20, 21, 22, and 23. The data input into the shift register 19 along line 18 circulates out of shift register 19 along line 20 and back into shift register control unit 17 along line 21. The data appearing on line 20 is also applied to output format control 46 and along line 23 to multi-column control logic and playout control 45. Further, the data appearing on line 20 is applied along line 22 to decode 44. The outputs of decode 44 include a justify signal along line 9, a flush left signal along line 10, and a tab format begin code, a tab format end code, and other character and control code signals along decode line 29. For example, if the flag code is defined by all one's, a flag signal output along line 29 will come up when the input along line 22 is made up of all one's.

Printer 2 has a ready output along line 11 which comes up when, for example, printer 2 is idle and ready for printing a character. This signal is applied to multi-column control logic and playout control 45. Logic and control 45 has output lines such as line 28 connected to print magnets (not shown) of printer 2 to cause printing. Other outputs from logic and control 45 include a carrier return line 27 for causing printer carrier 2a to return to the left margin, and tab lines 507 and 508 for printer carrier 2a to escape.

Outputs from logic and control 45 along tab lines 507 and 508 (TAB T and TAB G) are applied to output format control 46 to define the type of tab operation to be performed. An output is then applied along tab line 26 from output format control 46 to cause printer 2 to tab. More specifically, a signal is applied along TAB T line 507 upon detection of a tab code in shift register 19. Output format control 46 will address text tab rack control logic 500 along line 504 to determine the length of the escapement for the detected tab. A signal is applied along line 508 to output format control 46 to cause carrier 2a to escape to the next column tab stop during a column advance operation. The necessary escapement is determined in this case by output format control 46 addressing column tab rack control logic 501 along line 505. Output format control 46 is thus in two way communication with logic 500 and 501 along lines 504 and 505, respectively.

The information stored in text tab rack logic 500 is received from logic and control 45 along line 506 based on tab format lines stored in the shift register (buffer memory) 19. It is to be recalled that at the beginning of a job when tabs are to be set, or at any other time when tabs are to be changed, the operator causes carrier 2a to escape and depresses a tab set button 1a on keyboard 1 at desired tab stops such as T1, T2, etc., (FIG. 1). This causes tabs to be set in a text tab rack 904 (FIG. 19a) included in tab rack control logic 500 and storage of the tab set locations in memory (shift register 19) in the form of a format line. During later playout, the reading of a tab format line from memory 19 causes an updating of the text tab rack 904. The codes making up the tab format line are applied along line 22 to decode 44. The output of decode 44 is along line 29 to logic and control 45.

A significant operation of this invention is performed when a signal is applied along line 503 to column tab rack control logic 501. The result is that a copy of the information stored in the text tab rack 904 included in logic 500 is applied along line 502 and stored in a column tab rack 922 in FIG. 19b included in column tab rack control logic 501. This will be discussed further later in the specification.

SHIFT REGISTER CONTROL AND SHIFT REGISTER

The function of the shift register control 17 relative to shift register 19 shown in FIG. 14 is mainly to insert data into, delete data from, and maintain and recirculate data in shift register 19. The system clock 6 having an output line 7 is used for controlling system timing. This clock 6 has been again shown in FIG. 15 and designated by reference numeral 47. In fact, clock 47 could be a separate clock synchronized with clock 6. The output of clock 47 provides an input to the shift register 19 along lines 64 and 66, to N register 68 along lines 64 and 65, to E register 69 along lines 64 and 67, and to O register 70 along line 64. All data transfers occur on a clock signal. The normal mode of operation for the shift register 19 and shift register control 17 is for data to circulate out of shift register 19 along line 49 which is the shift register data buss line 49 is equivalent to line 20 in FIG. 14. This data is input to AND gate 51. Since a signal NOT trap D is normally up, the data on the shift register data buss 49 will be gated through AND gate 51 and along line 53 to OR gate 54. Reference in general herein to signals, inputs and outputs are to be taken as the up condition or positive logical level. The output of OR gate 54 is along line 55 to the N register 68. The NOT trap D input to AND gate 51 is along line 52. Characters or control codes appearing at the output of N register 68 normally shift along lines 57 and 58 to AND gate 76. This data is gated through AND gate 76 and along line 74 to OR gate 86. This is since the signals NOT expand path along line 73, NOT trap D along line 52, and NOT write along line 75 are normally up. The output of data from OR gate 86 is along line 93 to register 70. The letters N in register 68, E in register 69 and O in register 70 denote normal, expand, and output, respectively. The output of the output register 70 is along line 72 back into the shift register 19. The path thus described is termed the normal path. Characters and control codes appearing at the output of the normal register 68 are also shifted into the expand register 69 along line 57 in all cases. However, the data in the expand register 69 is not normally used.

When a code is to be inserted into shift register 19, it is applied along line 80 to latch register 81. The data in block 79 represents a data source which can be from keyboard 1 in FIG. 14. At this time, an external insert signal 94 is applied along the set line 95 to latch register 81. The insert block 94 can be obtained from an external source. With latch register 81 set, the data impressed upon the data buss 80 is stored in latch register 81. The same source as block 94, although separately represented by insert block 106, is applied along the set line 107 to latch register 108. When latch register 108 is set, an output is applied along the insert wait line 109. Latch register 108 is clock controlled along line 110 from clock 47. At this time, data will be shifting along the normal data path described above and the data to be inserted will be loaded into latch register 81. For a character to be inserted into memory 19 following the operation flag, characters in the shift register 19 continue to shift along the normal data path until the operation flag appears in the normal register 68. The operation flag being shifted along line 55 into register 68 is also shifted along line 60 into decode 77. Therefore, at the time that the flag is inserted into register 68, it is decoded by decode 77 and a flag N output is applied along line 78. The flag N signal appearing on line 78 is applied to AND gate 100. Since the other input to AND gate 100 is the insert wait signal applied along lines 109 and 99, the conditions are met for gating a signal along the write line 87. The write signal applied along line 87 is applied to AND gate 88. This will permit the contents of latch register 81 applied along line 82 to be gated through AND gate 88. The output of AND gate 88 is along line 89, through OR gate 86, and along line 93 to the output register 70. The write signal applied along line 87 is also applied to inverter 101 and the inverse thereof is applied along line 102. Therefore, a NOT write signal which is down is applied along line 102. This down signal appearing on line 102 is applied along line 75 to AND gate 76 to inhibit the gating of the flag through OR gate 86.

At this time the code to be inserted into the normal data path is gated from latch register 81, through AND gate 88, through OR gate 86 and into the output register 70. The operation flag is inhibited at AND gate 76. But, each character input to the normal register 68 is also input into the expand register 69. Therefore, the flag is input along line 57 to the expand register 69.

At the time that the operation flag is stored in the expand register 69, the write signal is applied along the set line 87 to latch 122. When latch 122 is set, an expand path signal is applied along line 83. On the same clock pulse that the data character is gated into the output register 70, the operation flag is gated into the expand register 69. This is when the expand latch 122 is set. Thereafter, a code appearing at the output of the expand register 69 is applied along line 71 to AND gate 84. With the expand path signal along line 83 being up, the code from the expand register 69 is gated through AND gate 84 and along line 85 to OR gate 86. From OR gate 86 the code is gated along line 93 to the output register 70. A down NOT expand path signal is applied along line 73 from latch 122 upon the setting of latch 122. This is applied to AND gate 76 to inhibit the gating of a code along lines 74 and 93 from the normal register 68 to the output register 70. As long as a positive signal appears on the expand path line 83, the flow of characters is from the shift register 19 to the normal register 68, to the expand register 69, to AND gate 84, and to the output register 70. This data path remains active until an end-of-memory (EOM) code is decoded by decode 44. When an end-of-memory code appears on the shift register data buss line 20, a signal is output along line 43 in FIG. 14 to shift register control unit 17. The input to the shift register control unit 17 shown in FIG. 14 of this end-of-memory code signal is represented by block 111 in FIG. 15. The end-of-memory code signal 111 is applied along line 112 to delay or shift register 113. The output of delay 113 is along line 114 to delay or shift register 115. The output of delay 115 is along line 116 to delay or shift register 117. The output of delay 117 is an EOM D3 signal applied along line 103. The signal along line 103 represents the end of memory delayed three bit times. The three bit times correspond to three clock times from clock 47 along line 110. Clock pulses appearing on line 110 are applied along lines 118 and 119 to delay 113, along lines 118 and 120 to delay 115, and along lines 118 and 121 to delay 117. After a delay of three bit times the end-of-memory code will be in the output register 70. The EOM D3 signal is applied along with the expand path signal along lines 103 and 83 to AND gate 104. The output of AND gate 104 is along the reset line 105 to latch 108. The EOM D3 signal along line 103 is also applied along the reset line to latch 122. When latch 122 is reset, a NOT expand path signal is applied along line 73. This causes restoration of the normal data path.

Another operation in addition to the insert operation above described will be labeled "trap". This is described below with reference to FIG. 15. The trap function or operation is to permit the rearrangement of characters within the shift register 19. An example of an operation where the trap function is useful is a paragraph advance operation. With characters shifting along the normal data path and a paragraph advance operation being in order, a trap signal will be applied along line 97. This signal is obtained from the trap block designated by reference numeral 96. This could originate from an operator keyed paragraph advance operation. Since an object can be to move the flag in memory 19 from its present position to the beginning of the next paragraph, the contents of the shift register data buss 20 are decoded until the flag is decoded by decode 44 in FIG. 14. With the trap signal appearing along the set line 97 to latch 98, an output is applied along line 61; being a trap D signal. During the clock time when the trap D signal comes up, the flag is gated into the normal register 68. At this time the trap D signal is applied along line 61 to AND gate 62. The other input to AND gate 62 is the output of the normal register 68 along lines 57, 58 and 59. Another output of latch register 98 is a down NOT trap D signal applied along line 52. This is applied to AND gate 51. As long as the trap D signal is up, the data appearing in the normal register 68 is gated back into the input maintaining the operation flag trapped in the normal register 68. This is because the output of AND gate 62 is applied along line 63, through OR gate 54, and along line 55 to normal register 68. The trap D signal along line 61 is also applied to the input of AND gate 91 along with the shift register data applied along line 50 from the data buss 49 to shift register data block 48. From block 48, the shift register data is applied along line 90 to AND gate 91. Data appearing at the output of shift register 19 is thereby gated through AND gate 91, along line 92, through OR gate 86, and along line 93 to output register 70. The above-described conditions will be maintained as long as the trap output of register 98 remains up along line 61. This signal along line 61 is to remain up until a required carrier return code is decoded by decode 44 and an output applied along line 29. Upon the decode of a required carrier return code along line 29 to latch register 98, the output of latch register 98 will be along the NOT trap D line 52 one bit time later. At this time, the carrier return code will have already been clocked into the output register 70 and the normal data path will have been restored. On the next clock time, the flag which is being held in the normal register 68 will be gated into the output register 70 behind the carrier return code. The character following the carrier return code will be gated through AND gate 51, OR gate 54, and into the normal register 68.

Figure 15:
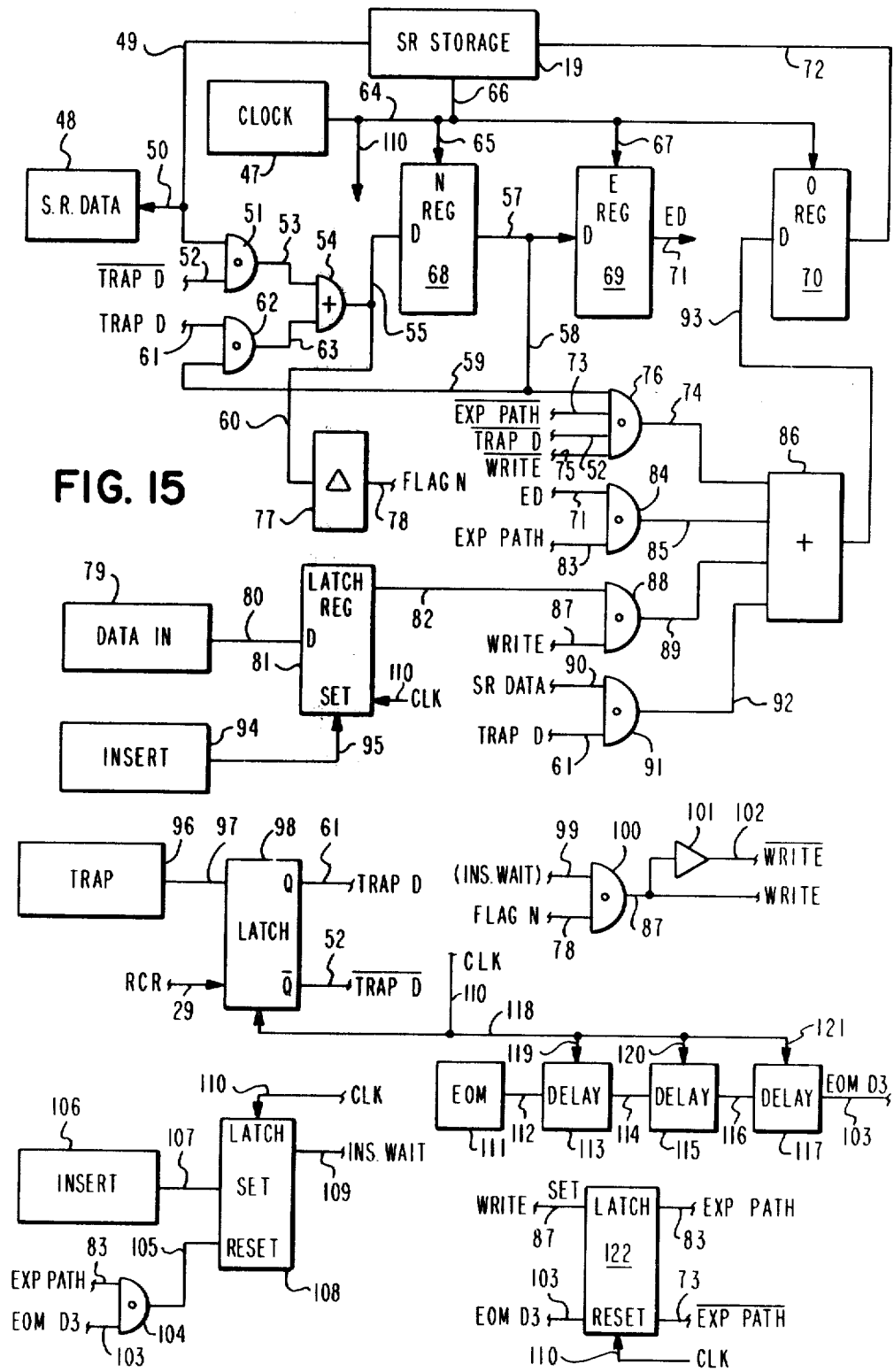
FIG. 15 illustrates in greater detail structure included in, and associated with, the shift register control unit of FIG. 14.

Referring again to FIG. 14, it is to be assumed that the shift register 19 has already been loaded with a beginning of memory code, and followed in order by an operation flag and an end-of-memory code. Upon the keying of data by the operator, the data is stored in the shift register 19 through an insert operation as above described. The keyboard data appears on line 12 and for each code keyed, a keyboard strobe signal is applied along line 5. This causes the data appearing on the data buss 12 to be gated through AND gate 13 and along line 14 to OR gate 15. The keyboard strobe signal applied along line 5 is also applied to OR gate 39. The output of OR gate 39 is an insert signal applied along line 40 to the shift register control 17. Each code keyed is therefore inserted into the memory 19 between the beginning of memory code and the end-of-memory code. For playout of a page stored in memory 19, the operator will depress a memory return button 1b and a signal will be applied along line 3 from keyboard 1. This signal is also applied along line 36 to multi-column control logic and playout control 45. The trap signal represented by block 96 in FIG. 15 is output by logic and control 45 along lines 41 and 42. This can be for repositioning the flag code immediately after the beginning of memory code for a playout operation. Thereafter, the operator will depress a playout button 1c and a playback signal will be applied along line 4 from keyboard 1. This signal is applied to both logic and control 45 and output format control 46 along line 35. When the flag appears on the shift register data buss 20 and at decode 44, the trap signal is brought up for only one bit time. This causes the advancing of the flag one position in memory 19. Also, logic and control 45 will gate the data on the shift register data buss 20 into an internal storage register 45a on the bit time following the occurrence of the flag code on the shift register buss 20. When the ready condition is received along line 11 from printer 2, a character will be printed due to the signal applied along the print magnet line 28 to printer 2. The character following the operation flag will be printed. The above operation is repeated for each character with the operation flag being advanced toward the end of memory 19. When a space or tab is detected in the data flow, the flag is advanced in the normal manner. However, output format control 46 will output a space to printer 2 along line 24 or tab along line 26 and control escapement through the counting of emitter pulses applied from printer 2 to output format control 46 along line 25. Output format control 46 addresses text tab rack control logic 500 along line 504 to determine the necessary escapement value. A signal is applied along line 507 by logic and control 45 to cause control 46 to address the text tab rack control logic 500. Output format control 46, which will be described in more detail later in the specification, is designed to control the output format. It receives mode commands from logic and control 45 such as scan along line 34, justify along line 33, flush left along line 32, and measure along line 31. Further, it continuously monitors the shift register data buss 20 and decodes from decode 44. The decodes from decode 44 are applied along line 29 to output format control 46 and along line 30 to logic and control 45. Logic and control 45 will be discussed in greater detail later in the specification. Output format control 46 further has the capability to scan the data appearing on the shift register data buss 20 and to calculate justification solutions when a justify command is issued along line 33 from logic and control 45. It is therefore the function of control 46 to continuously monitor output and provide the correct value for any space or tab outputted according to the information supplied by logic and control 45.

Logic and control 45 contains storage facilities such as random access memories 45b wherein the mode code is stored when the flag is advanced beyond a mode code. Logic and control 45 also contains storage facilities for the measure code which follows every mode code. Again, random access memories 45b can be used for this which have an included memory address register and counter 45c.

Referring again to FIG. 5, the flag is addressing the mode-measure codes during playout. These codes will be stored in logic and control 45. This data will be output to control 46 continuously. Control 46 will in turn scan the data following the mode-measure codes to form a justification solution, and on each space or tab, will control the space magnet 2c or tab magnet 2d and escapement in printer 2 in order to correctly print a justified line.

In normal operation, each time the operation flag addresses a carrier return code, logic and control 45 will output a carrier return along the carrier return line 27 to printer 2. The flag is then advanced past the carrier return code. At this time control 46 will scan the next line to calculate a justification solution. These operations continue until the operation flag addresses the first tab format begin code (TFB) defining the beginning of a tab format line.

Upon decoding a tab format begin code during playout, a signal is applied along line 29, and printout is suspended while the tab format line is scanned. Scanning continues to the end of the tab format line defined by the tab format end code. The information contained in the tab format line is decoded and loaded into the text tab rack control logic 500 for storage. That is, tab stops are set in the text tab rack 904 (FIG. 19a) included in logic 500. Assuming a column begin code follows the tab format line, the flag is then advanced in memory 19 until it is positioned just after the tab format end code and is addressing the first column begin code.

SET UP OF COLUMN MARKERS

As pointed out above, logic and control 45 continuously monitors the output of decode 44. The output of decode 44 is applied along lines 29 and 30. When a column begin code is detected following the operation flag, a column marker code is generated and output along line 37 to OR gate 15. The signal MCS insert along line 38 is applied to OR gate 39. This is applied at the proper time to cause insertion of the column marker code into shift register 19 following the second column begin code. From the above, a column marker code is to be inserted into each column except the first.

Following the insertion of the column marker code into the memory 19 following the second column begin code, a scan is performed to locate the next column begin code following the flag. Upon detection of this next column begin code, another column marker code is inserted in the memory 19. This is repeated for each column begin code found in memory 19 between the operation flag and the column end code.

Before all column marker codes are inserted into the memory 19, a trap signal is generated by logic and control 45 along lines 41 and 42. This is for repositioning the operation flag in memory 19 and locating it at a position beyond the first column begin code as illustrated in FIG. 4. FIG. 5 illustrates the memory arrangement after insertion of the column markers.

FORMAT SCAN

The next operation involves temporary suspension of printout while logic and control 45 again scans the data in the shift register 19 appearing on line 23 and the output of decode 44 along lines 29 and 30. All format codes between the beginning of memory and the flag position are scanned. These codes include mode, measure, tab format line codes, column begin, etc. If any tab format lines are detected, the information is decoded and stored in the text tab rack 904. When mode-measure codes are detected, they are stored in an internal register such as a random access memory 45b.

Before further playout resumes for the columnar text, the critical operation of transferring a copy of the contents of the text tab rack 904 into the column tab rack 922 (FIG. 19b) is performed. Multi-column control logic 45 applies a signal along line 503 to initiate this operation. Logic 501 will then perform the remainder of the operation as will be more fully described hereinafter. The tab setting information stored in the shift register 19 ahead of the first column begin code is the same information transferred to the column tab rack 922 included in column tab rack control logic 501 from the text tab rack 904 included in the text tab rack control logic 500. This occurs when the first column begin code is detected during playout.

Playout then continues and another tab format begin code TFB is immediately encountered after the column begin code as shown in FIG. 4. As before, the following tab format line is scanned, decoded, and stored in the text tab rack 904. At this point, the tabs necessary to format the text contained within each column are stored in the text tab rack 904.

Playout continues following storage of the second format line information in the text tab rack 904. The mode-measure codes that define the first column playout format are detected and stored in logic 45 and then output to control 46.

After advancing the flag past the mode-measure code, a scan signal is applied along line 34 to control 46. The output format control 46 then scans the memory 19 from the flag to the first carrier return to form a justification solution. Upon detecting the first tab code at the beginning of this line, the output format control 46 addresses the text tab rack control logic 500 along line 504 for the length (number of escapement units) of this tab. This is done by outputting the carrier position in escapement units with respect to the left margin of the first column to logic 500. Logic 500 substracts this number from the distance to the next tab stop in its included tab rack 904 and outputs the difference in escapement units back along 504. This operational sequence is repeated for each tab. Referring to FIG. 1, there are two tabs before text for the first line of the left column. The returned differences are then used by logic 46 in calculating the justification solution for the remainder of the line. Control 46 utilizes the mode-measure output from logic and control 45 to compute a solution for inter-word space width based on this mode-measure and the text on the line.

Again, a tab is the first code to be printed during playout of the first line of the first column. Logic and control 45 outputs a TAB T signal to control 46 along line 507. Output format control 46 again addresses the text tab rack control logic 500 for the proper escapement. Once it is received, control 46 initiates a tab by the printer over line 26 and then controls the escapement. Following the tabbing operations, playout continues with the flag advancing and characters and spaces being printed as controlled by control 46. When the flag addresses the first carrier return code at the end of the first line of the left column, the carrier 2a will be at a position corresponding to the end of the measure of column 1. This is since all characters and spaces will have been output for the first line of that column in a justified format. With the operation flag addressing a carrier return code, the flag is advanced beyond the carrier return code and the signal TAB$^G$ is applied along line 508 to control 46. Output format control 46 then addresses logic 501 through outputting the carrier position with respect to the overall left margin to logic 501 along line 505. Column tab rack control logic 501 calculates the difference between this location and the next tab stop in the column tab rack 922. The difference is returned to control 46 along line 505. Output format control 46 then initiates a tab over line 26 and controls the escapement utilizing the escapement magnet line 25a and the emitter signals from the printer 2. A column advance operation is then performed for repositioning the operation flag to the beginning of the first line of the second column. This is effected by writing a column marker code over the flag, and writing a new flag over the next column marker code. At the completion of the column advance operation, the memory 19 will appear as shown in FIG. 6. That is, the operation flag will be located in the second column and the column marker code in the first column will be addressing the second line. This will indicate that the first line has been printed out.

The above-described operations beginning with format scan are repeated. The information accumulated during this format scan is only used to determine if any format changes were entered into memory 19 between the end of the first line of the first column and the beginning of the first line of the second column. The mode-measure codes stored at the beginning of this line are stored as before, and a scan signal is applied along line 34 to control 46 to cause a justification solution to be calculated for this line based upon this new mode-measure information.

When the operation flag addresses a carrier return code at the end of the first line of the right column, a carrier return is output from logic and control 45 along line 27 to printer 2. Thereafter, a column advance operation is performed. As before, a column marker code is written over the operation flag and a new operation flag is written over the next column marker code. The next column marker code is in the left column. The memory 19 will now appear as shown in FIG. 8, and the printed page and carrier position will be as shown in FIG. 9.

Playout progresses as described through the first six lines of each column. Each time a tab operation is to be performed between the end of a line in the first column to the beginning of a line in the second column, the column tab rack 922 is addressed. Each time a tab in memory 19 is detected, the text tab rack 904 is addressed. For the tabs at the beginning of the third through thirteenth lines of the second column, the carrier position applied to the text tab rack control logic 500 is referenced with respect to the left margin of this column. Text tabs are always referenced to the left margin of the column and not the overall left margin. Column tabs are referenced to the overall left margin. After every column advance and column tab operation, a format scan of memory 19 is performed from the beginning of columnar text to the flag position to detect format changes.

EMPTY COLUMN

Upon a column advance out of the last column following playout of the sixth line, a new operation flag is written into memory 19 over the next column marker code in the first column. This follows a write over of the operation flag with a column marker code. The flag code is now addressing the column begin code in the right column as shown in FIG. 11. This will indicate to the system that the left column is empty. At this time, the first six lines of every column have been printed and the printed page will appear as shown in FIG. 10. From this point on, each time a column advance operation is performed and the flag is advanced to the first column, a column tabbing operation will be immediately initiated. This is due to the left column being empty. Another column advance operation will be performed to advance the flag to second column and playout from the second column will resume. Playout continues until the flag is addressing the column end code. At this time both columns will have been printed in their entirety. The flag is advanced past the column end code and the column marker codes are deleted from memory 19.

Figure 16:
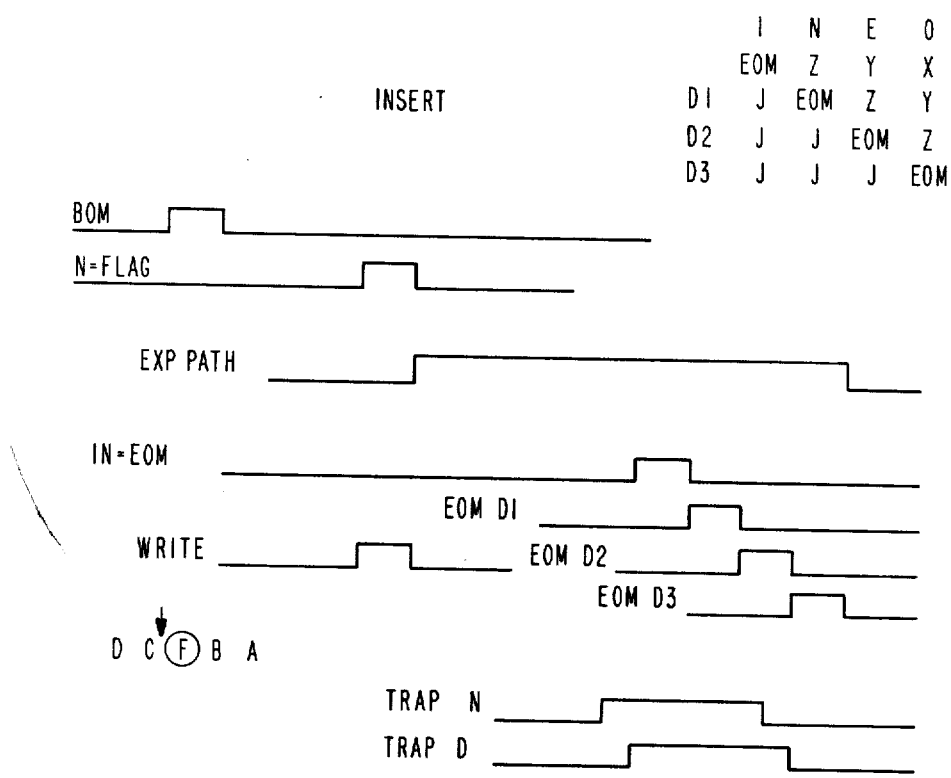
FIG. 16 is a timing diagram for operations performed by the structure set out in FIG. 15.

Referring next to FIG. 16, there is shown a timing diagram illustrating the timing of the operations and signals for an insert operation as described above with reference to FIG. 15. Shown are the beginning of memory (BOM), the flag in the normal register 68, the expand path signal, the EOM code in the normal register 68, the EOM D1 signal, the write signal, the EOM D2 and the EOM D3 signals, the trap N signal, and the trap D signal.

MULTI-COLUMN CONTROL LOGIC AND PLAYOUT CONTROL

Referring next to FIGS. 17a-f there is shown in simplified form the structure included in the multi-column logic and playout control block 45 of FIG. 14. A column begin code signal appearing at the output of decode 44 and along line 29 during scanning is applied to AND gate 401. Another input to AND gate 401 is along playback lines 4 and 124 from keyboard 1. The remaining input to AND gate 401 is derived from detection of the flag on the previous bit time. The flag code signal is applied along line 29 to shift register or delay 400. On the next bit time, which is the same as the bit time of the column begin code, a signal is applied along line 125. With the inputs to AND gate 401 being up, an output is applied along line 126 to advance the flag and set latch 402. When latch 402 is set, a CSCAN signal is applied along line 132 and also along line 127 to AND gate 403. The other input to AND gate 403 is the column begin code signal output along line 29 in FIG. 14 upon detection of the second column begin code. The output of AND gate 403 is along line 128 to AND gate 404. The other input to AND gate 404 is from column marker code generator 405 along line 130. When a column marker code is gated through AND gate 404, it is applied along line 129 and inserted into shift register 19 following the second column begin code. Scanning continues. The output of the latch 402 along line 132 is applied to AND gate 406. This will result in a reset scan (RSTCS) signal being applied along line 131 when a column end code signal is applied along line 29 to AND gate 406. The reset scan signal along line 131 is also applied to OR gate 420 (FIG. 17f) along line 538. The SETFS output of OR gate 420 along line 539 is applied along line 133 to set latch 407. When latch 407 is set, all column markers have been inserted and a format scan is to be performed.

Figure 17A:
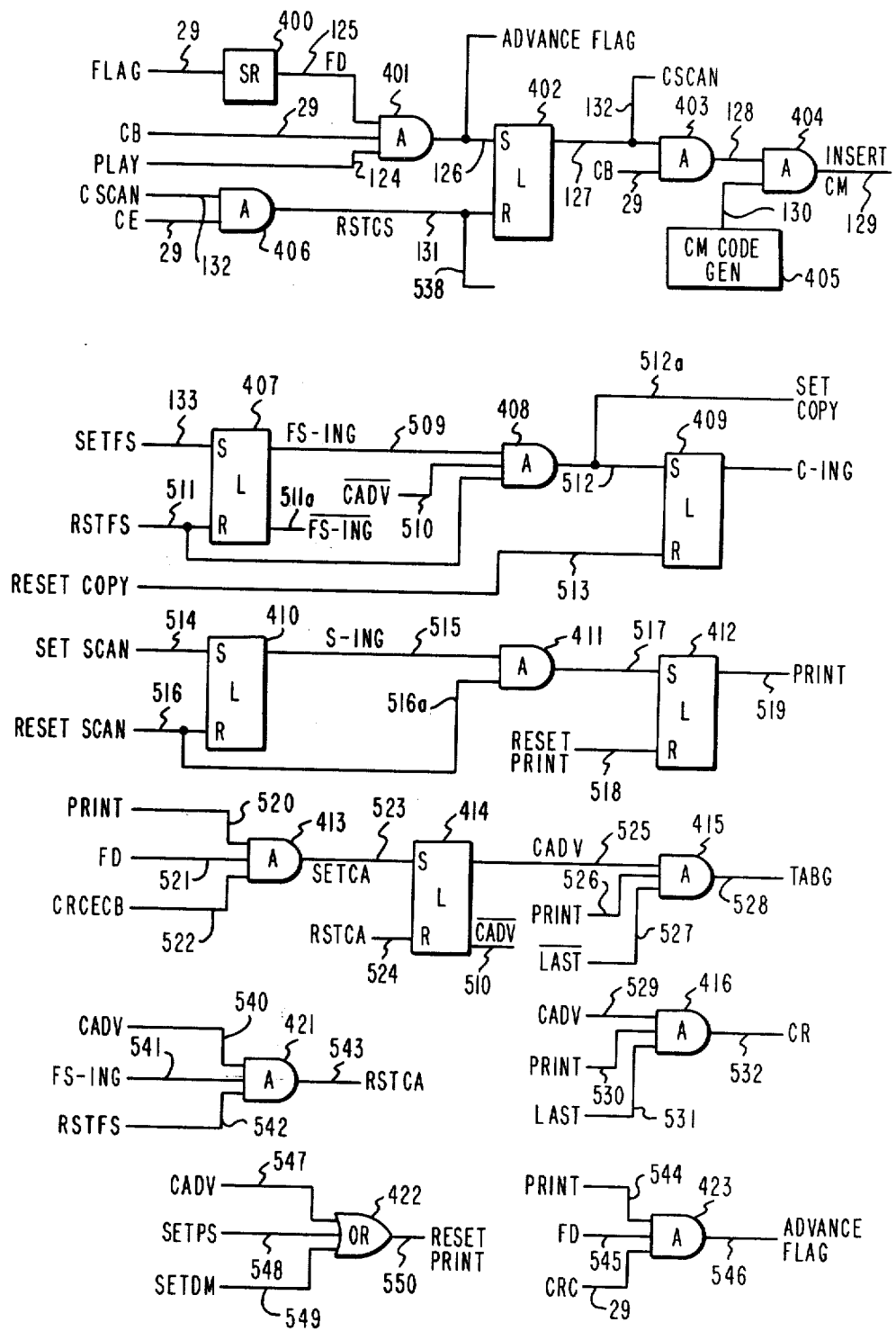
FIGS. 17a through f illustrate the structure included in the multi-column control logic and playout control of FIG. 14.
Figure 17B:
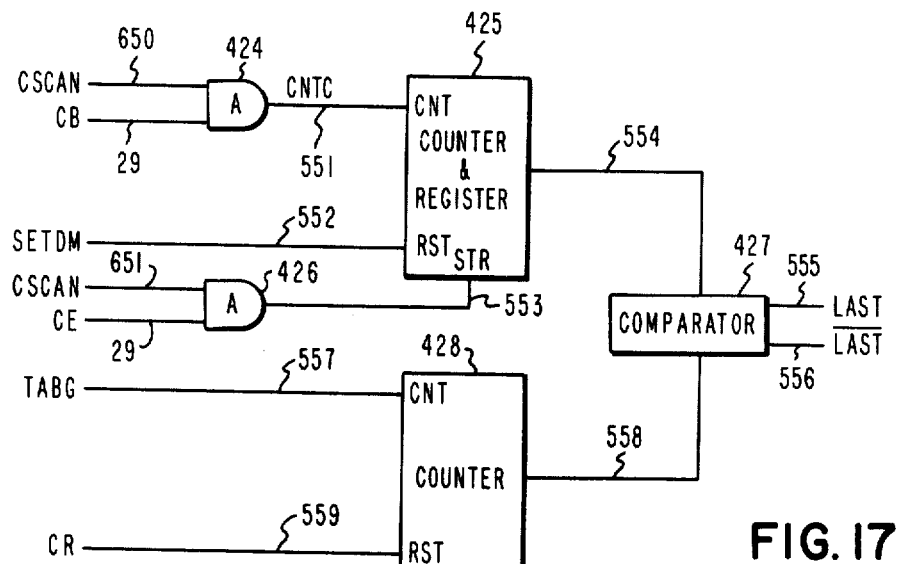
Figure 17C:
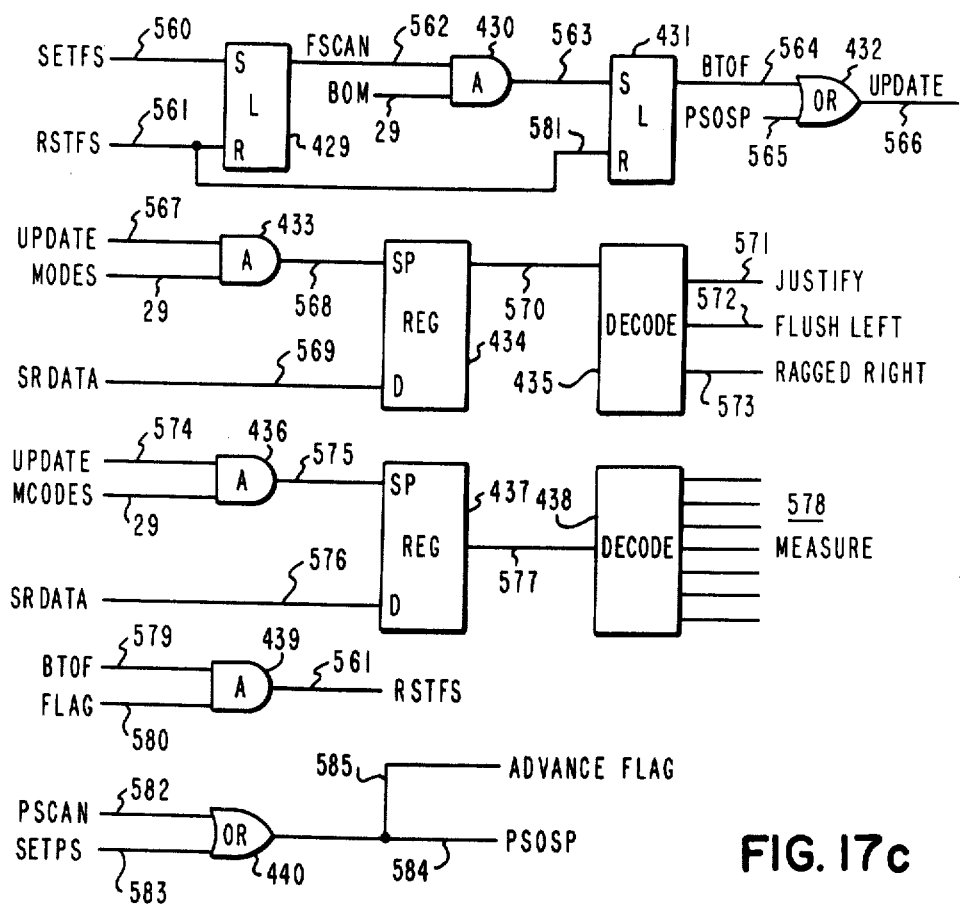

The output of OR gate 420 along line 539 is also applied along line 560 to set latch 429 in FIG. 17c. The FSCAN output of latch 429 along line 562 when set is applied to AND gate 430. The other input to AND gate 430 is along line 29 when the beginning of memory code is decoded. The output of AND gate 430 is along line 563 to set latch 431. The BTOF output of latch 431 is applied along line 564 to OR gate 432 and then along the update lines 566 and 567 to AND gate 433. The BTOF output along line 564 is also applied along line 579 to AND gate 439. The decode of all mode codes is also applied along line 29 to AND gate 433 and the output along line 568 sets the sample input of register 434. The mode stored in the shift register 19 and applied along line 569 is then stored in register 434. In a like manner, the decode of all measure codes is applied along line 29 to AND gate 436. When an update signal is applied along line 574, an output is applied along line 575 to set the sample input of register 437. This causes the measure data stored in the shift register 19 to be applied along line 576 and stored in register 437. Any succeeding modes and measures decoded by decode 44 are written over the contents of registers 434 and 437, respectively, until the flag is decoded. The output of latch 431 along line 564 when set, the flag decode along line 580, are both applied to AND gate 439 to effect a reset signal RSTFS along lines 561 and 581 to latches 429 and 431, respectively. This terminates the format scan and also resets latch 407 along line 511 (FIG. 17a).

Figure 17D:
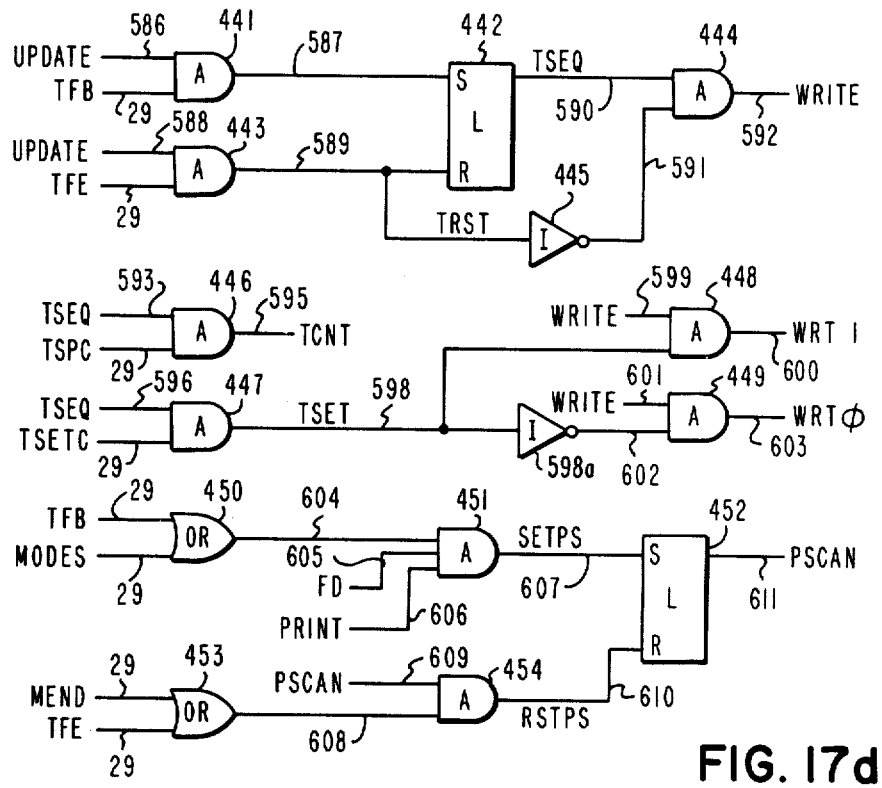
Figure 17E:
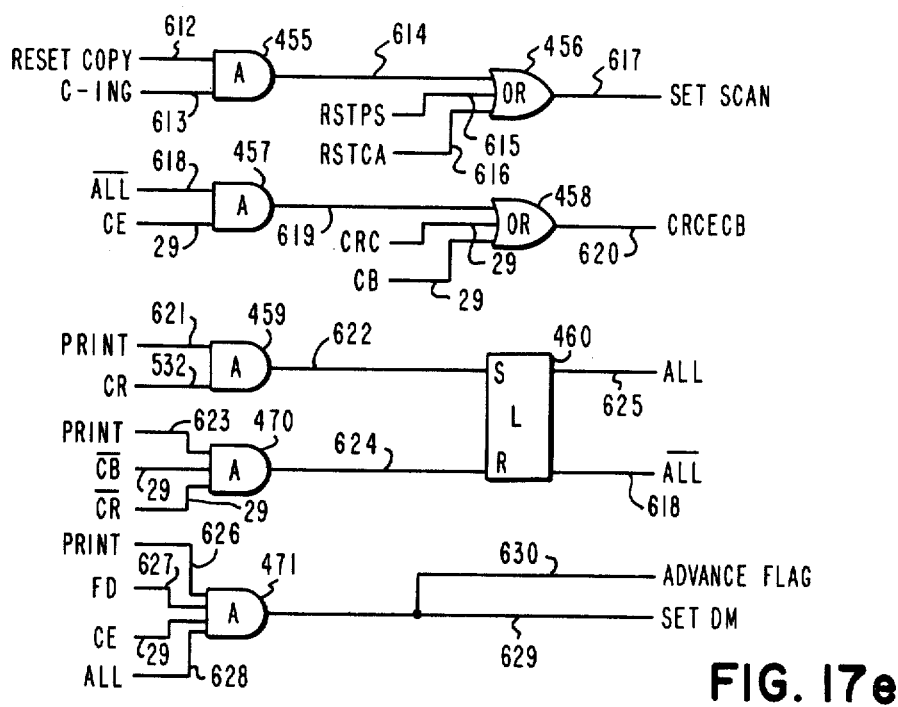

In order to store tab information during the format scan, the output of OR gate 432 in FIG. 17c along line 566 is also applied along lines 586 and 588 to AND gates 441 and 443 in FIG. 17d. Upon the decode of a tab format begin code, a set signal is applied along line 587 from AND gate 441 to latch 442. When latch 442 is set, a signal is applied along line 590 to AND gate 444, along line 593 to AND gate 446, and along line 596 to AND gate 447. Upon the decode of tab space codes along line 29 from decode 44, a count signal output from AND gate 446 is applied along line 595 to the text tab rack logic 500. Upon the decode of tab set codes along line 29 from decode 44, a tab set signal from AND gate 447 is applied along 598 to AND gate 448. As pointed out earlier, the tab format line is made up of tab set locations for the tabs. More specifically, a number of spaces are stored in memory 19 and followed by a unique code. The spaces are tab spaces and the unique code is the tab set code. The output of AND gate 448 is along line 600 to the text tab rack logic 500 when a write signal is applied along line 599. The output of AND gate 443 is a reset signal for latch 442 along line 589 when a tab format end code is decoded and a signal is applied along line 29 in conjunction with an update signal along line 588. This reset signal is inverted by inverter 445 and applied to AND gate 444 along line 591 to inhibit an output of AND gate 444. When not inhibited, a write signal is applied along lines 592 and 599 to the text tab rack control logic 500 and AND gate 448. Any succeeding tab format information will be sent to the text tab rack 904 to replace the previously stored information. The output of AND gate 447 along line 598 is also applied to inverter 598a. The output of inverter 598a is along line 602 to AND gate 449. The other input to AND gate 449 is along line 601. The output of AND gate 449 is along line 603.

The reset format scan signal applied along line 511 in FIG. 17a is also applied to AND gate 408 along with the set output of latch 407 and the reset output of latch 414 along line 510. The output of AND gate 408 is along set line 512 to latch 409. The signal applied along line 512 is also applied along line 512a to the column tab rack control logic 501. When a reset copy signal is received back from logic 501, latch 409 is reset along line 513.

AND gate 455 (FIG. 17e) receives inputs along lines 612 and 613. The input along line 612 is the reset copy signal and the input along line 613 is output of latch 409 (FIG. 17a). The output of AND gate 455 along line 614 is to OR gate 456 and then along line 617. This signal is applied to the output format control 46 to cause a scan of the line following the flag for space size calculation purposes.

The signal applied along line 617 is also applied along line 514 to set latch 410 (FIG. 17a). Latch 410 remains set while the output format control 46 is calculating space size for justification purposes. Once the calculating operation is complete, a reset scan signal is sent back from control 46 along line 516 to reset latch 410. This reset signal is also applied along line 516a along with the output of latch 410 along line 515 to AND gate 411. The output of AND gate 411 along line 517 is used to set latch 412. The output of set latch 412 is applied along line 519 to cause the printing of characters and the execution of functions defined by format codes.

The decodes of a tab format begin code and all mode codes are applied along line 29 to OR gate 450 (FIG. 17d) and the output thereof is applied along line 604 to AND gate 451. If either type of code is encountered during printing, an up signal is applied along line 606. When an up signal is applied along line 605, an output is applied along line 607 from AND gate 451 to set latch 452. The signal appearing on line 607 and the latch output PSCAN along line 611 are both applied to OR gate 440 in FIG. 17c along lines 583 and 582. A signal is then applied along lines 584 and 565 to OR gate 432. The output on line 584 is also applied along line 585 to effect a flag advance.

The output of latch 414 along line 525 is also applied along line 547 to OR gate 422 in FIG. 17a. The output of OR gate 422 is along line 550. Other inputs to OR gate 422 are along lines 607 and 548 from AND gate 451 in FIG. 17d, and along lines 629 and 549 from AND gate 471 in FIG. 17e. This causes printing to cease when the defined operations are performed. The signal applied along line 584 causes a format scan. However, in this case, the print format scan only lasts until the end of the particular format line encountered. Latch 452 in FIG. 17d is reset when a signal is applied along line 610 from AND gate 454. The signal appearing on line 610 is also applied along line 615 to OR gate 456 (FIG. 17e) and an output is applied along line 617. With an up signal applied along line 609 and either a measure end or tab format end code signal along line 29 from decode 44 applied to OR gate 453 and along line 608, an up signal is applied along line 610 to reset latch 452. Once the print format scan is complete, printing continues.

There is an up output from OR gate 458 (FIG. 17e) along line 620 if either of three codes is detected by decode 44. The first two are carrier return and column begin along line 29. The third, column end along line 29, is only gated along line 619 from AND gate 457 to the input of OR gate 458 if latch 460 is reset. When latch 460 is reset, a signal is applied along line 618. Latch 460 is set by an up output from AND gate 459 along line 622 when a carrier return is issued to the printer 2 and a signal is applied along line 532 during printing. A print signal is applied to AND gate 459 along line 621 when the printer 2 is printing. This signal is also applied along line 623 to AND gate 470. The output of AND gate 470 is along reset line 624. Latch 460 will be reset if any code other than a column begin or carrier return along line 29 is decoded during printing.

The output of AND gate 413 (FIG. 17a) is up when either a carrier return, column begin, or column end code is decoded during printout and a signal is applied along line 522. The inputs denoting printing and the flag preceding text are along lines 520 and 521.

The up output of AND gate 413 is along the set line 523 to latch 414. When latch 414 is set, and output is applied along line 525 to AND gate 415 and along line 529 to AND gate 416. The result is the execution of either a column tab operation or a carrier return to the left margin of the page. The print inputs to AND gates 415 and 416 are along lines 526 and 530 and indications of the last column, or NOT the last column, are applied along lines 531 and 527. The output of AND gate 415 is along the TABG line 528 and the output of AND gate 416 is along the carrier return line 532. If a line from the last column were just printed, a carrier return operation would be performed. If not, a tab operation to the next column tab stop would be performed. The last and NOT last inputs to AND gates 416 and 415 originate from comparator 427 (FIG. 17b) and are applied along lines 555 and 556.

Comparator 427 receives an input from counter and register 425 along line 554 and counter 428 along line 558. Counter 428 is a resettable up counter and is incremented each time a column tab operation is performed. It is reset each time a carrier return operation is performed. The column tab input is along line 557 and the carrier return input is along line 559. The count in counter 428 thus corresponds to the column being printed. Counter and register 425 is a resettable up-counter and store. It is reset along line 552. The counter 425 is incremented for each column begin code decoded during the original column scan to insert column marker codes. The scan and column begin inputs are along lines 650 and 29 to AND gate 424. The output of AND gate 424 is along line 551 to counter and register 425. When the column end code is detected, the count contained in the counter 425 is stored in its store. The scan and column end inputs are along lines 651 and 29 to AND gate 426. The store output of AND gate 426 is along line 553 to counter and register 425.

Figure 17F:
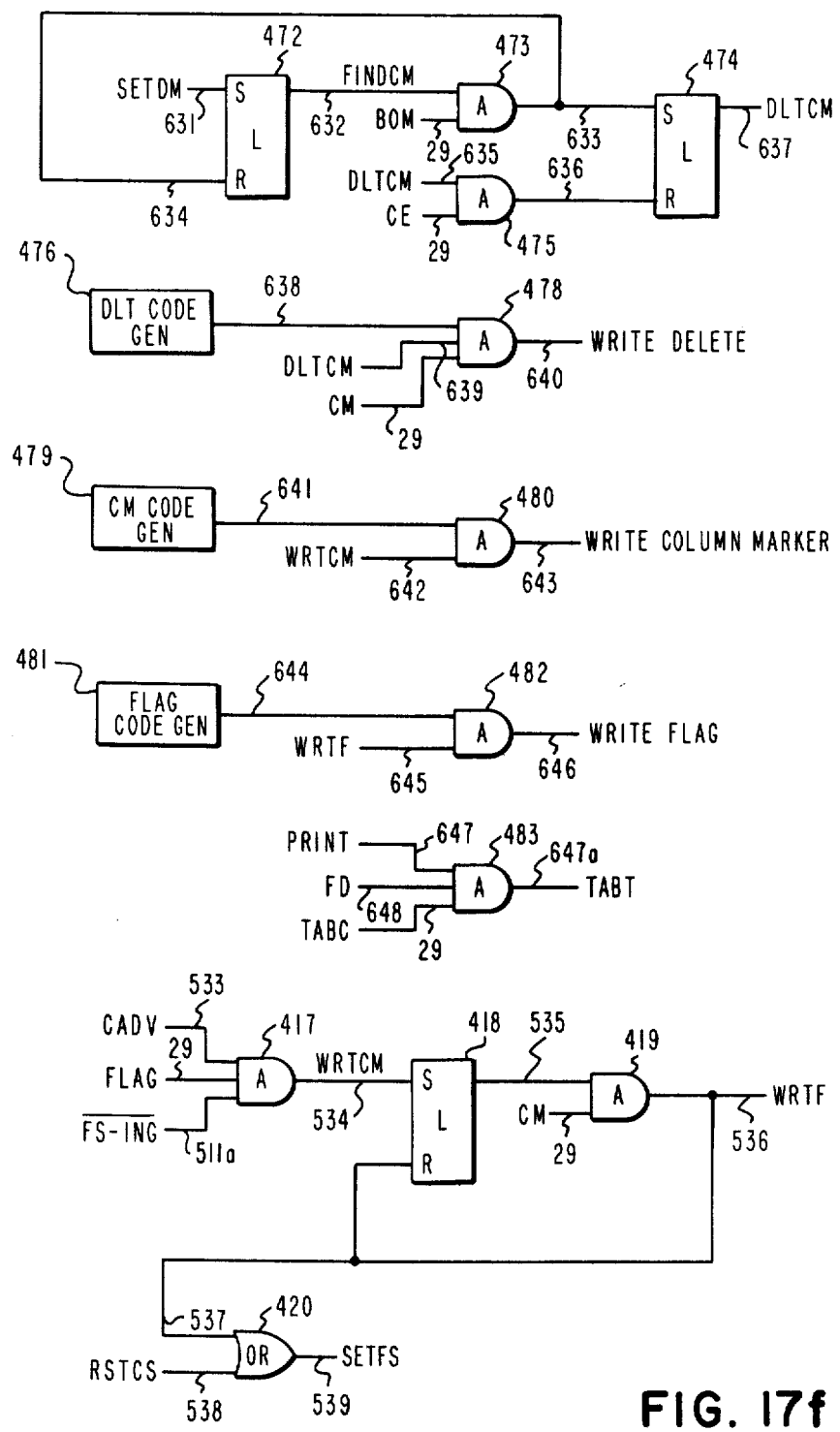

Latch 414 (FIG. 17a) also initiates a column advance operation along line 525 in parallel with the column tab or carrier return operations. With latch 414 set and the flag code detected by decode 44, inputs are applied along lines 533 and 29 to AND gate 417 (FIG. 17f). The other input to AND gate 417 is along line 511a from latch 407 (FIG. 17a). The output of AND gate 417 is along the set line 534 to latch 418. When latch 418 is set, an output is applied along line 535 to AND gate 419. When a column marker code is decoded and an input applied along line 29, an output is applied along line 536 to cause a flag to be written over the column marker code. The output along line 534 is used to cause a column marker code to be written over the flag. The output along line 536 is also used to reset latch 418 and is applied along line 537 to OR gate 420. Another input to OR gate 420 is along line 538 and the output thereof is along line 539.

The output along line 539 sets latch 429 (FIG. 17c) along line 560 and latch 407 (FIG. 17a) along line 133. When latches 407 and 429 are set, outputs are applied along lines 509 and 562 to cause a format scan operation and a resultant updating for the format conditions in effect at the new flag location. When a reset format scan signal is now applied along line 511 to AND gate 408, latch 409 will not be set. This is because of the down input along line 510 to AND gate 408. It is to be recalled that the transfer of the text tab rack 904 contents to the column tab rack 922 only occurs after the first format scan at the beginning of the column playout operation.

When a signal is applied along line 511 to reset latch 407 in FIG. 17a, a signal is applied along line 541 to AND gate 421. Another input to AND gate 421 is along line 542. The output of AND gate 421 is along lines 543 and 524 to reset latch 414. The output applied along line 543 is also applied along line 616 to OR gate 456 in FIG. 17e. The output of OR gate 456 is along the set scan line 617. This is applied to control 46 to obtain a space size solution for the next line.

Referring again to FIG. 17a, when a carrier return signal appears on line 29, a delayed flag signal appears on line 545 from line 125, and a print signal appears on line 544, there is an advance flag output from AND gate 423 along line 546.

Printing, column advancing, format scanning, column tabbing between columns, and calculation of space sizes continue until all text from all columns has been printed. When these operations have been completed, an output is applied along lines 629 and 630 from AND gate 471 in FIG. 17e. There will be inputs to AND gate 471 along lines 626, 627, 628 and 29. The input along line 628 is when latch 460 is set and an output is applied along line 625. The flag is advanced past the column end code, a delete marker code operation is initiated, and the print latch 412 is reset along line 518. Latch 472 in FIG. 17f is set by the output of AND gate 471 along lines 629 and 631 for deleting the column marker codes.

The output of latch 472, when set, is along line 632 to AND gate 473. When the beginning of memory code is detected, a signal is applied along line 29 to AND gate 473. The output of AND gate 473 sets latch 474 along line 633 and resets latch 472 along line 634. Thereafter, each time a column marker code is detected, a signal is applied to AND gate 478 along line 29. Another input to AND gate 478 is from latch 474 along lines 637 and 639. The remaining input to AND gate 478 is along line 638 from delete code generator 476. The output of AND gate 478 along line 640 causes a delete code to be written over the detected column marker code. Upon detection of the end of the column memory (CE), the output of AND gate 475 is applied along line 636 to reset latch 474. The inputs to AND GATE 475 are along lines 637 and 635, and 29. This terminates the operation of flushing column marker codes from memory 19.

The operations of generating and causing a writing of column marker and flag codes into memory 19 is similar to those for delete codes. A column marker code generator 479 outputs codes along line 641 to AND gate 480. The other input to AND gate 480 is along lines 534 and 642 from AND gate 417. The output of AND gate 480 is along line 643. In like manner, a flag code generator 481 generates codes which are applied along line 644 to AND gate 482. The other input to AND gate 482 is along lines 536 and 645 from AND gate 419. The output of AND gate 482 is along line 646.

Any time during the printing of any line that a tab code is detected and a signal applied along line 29 to AND gate 483, a signal is applied along line 647a to output format control 46. The inputs to AND gate 483 are along lines 647, 648 and 29. Control 46 causes the tab operation to be performed by addressing to the text tab rack 904 for its escapement.

Referring again to FIG. 17c, the output of register 434 is applied along line 570 to decode 435. The output of decode 435 is a justify code along line 571, a flush left code along line 572, or a ragged right code along line 573. In like manner, the output of register 437 is along line 577 to decode 438. The output of decode 438 is a measure code along line 578.

OUTPUT FORMAT CONTROL

Refer next to FIGS. 18a–e. Shown in these figures are the structure and timing therefor included in output format control 46 for justifying output lines.

From the above, character escapement is controlled through the counting of emitter pulses applied from printer 2 to output format control 46 along line 25. The function of control 46 is to continuously monitor playout and provide the proper escapement for any character, tab or space to be played out according to the mode and measure supplied by control 45.

Before a line can be formatted, it is scanned and a space size solution is calculated. During playout, logic and control 45 controls the printer magnets along line 28 to initiate printing while output format control 46 controls character, tab and space escapement by counting emitters from the printer 2. Multi-column control logic and playout control 45 initiates the scan operation by applying scan signal along line 34 to output format control 46.

Figure 18A:
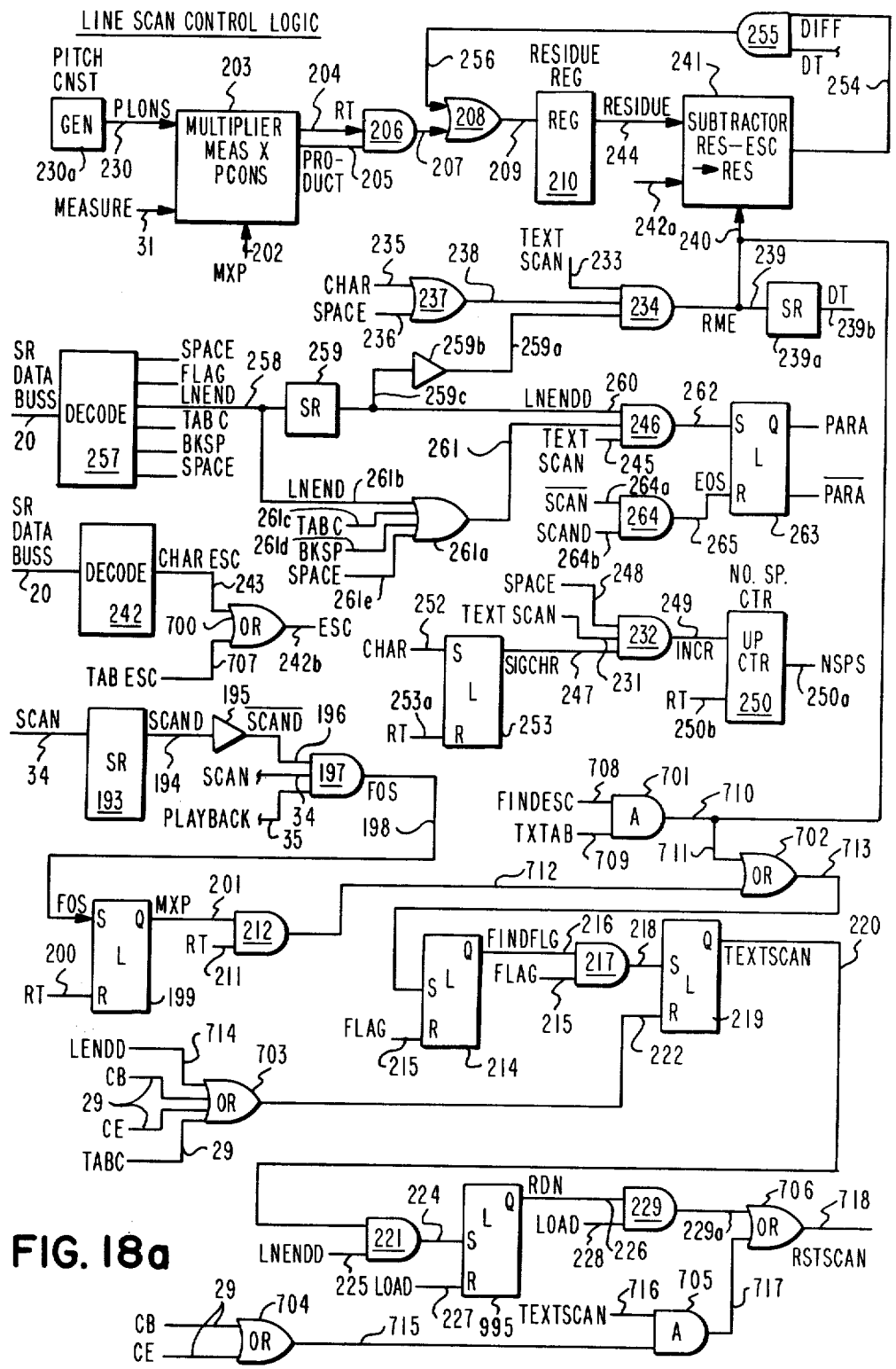
FIGS. 18a through g depict both the structure included in the output format control of FIG. 14 and the timing for operations performed thereby.

Refer next specifically to FIG. 18a. Beginning at the left middle of the figure, the scan signal along line 34 is applied to shift register 193 and delayed one bit time. Thereafter, it is applied along line 194 to inverter 195. The inverted and delayed signal is applied to AND gate 197 along line 196. The other inputs to AND gate 197 are scan along line 34 and playback along line 35. The output of AND gate 197 is a front of scan (FOS) signal along line 198 which sets latch 199. When set, an MXP output is applied along line 201 to AND gate 212. Another input to AND gate 212 is along line 211. The output of AND gate 212 is along line 712 to OR gate 702. The output of OR gate 702 is along line 713 for setting latch 214. When latch 214 is set, a find flag output is applied along line 216 to AND gate 217. The other input to AND gate 217 is upon a decode of the flag and a signal applied along line 215. The output of AND gate 217 is along the set line 218 to latch 219. When latch 219 is set, a text scan output is applied along line 220 to AND gate 221. The other input to AND gate 221 is along line 225. The output of AND gate 221 is along the set line 224 to latch 995. Up to now the sequence of events controlling the entire scan operation have been defined. The output of each set latch controls one or more operations and is reset when the operations are complete. That is, the output of latch 199 along line 201 is applied along line 202 to multiplier 203. In multiplier 203 a product is obtained of the measure in half picas applied along line 31 and the half pica pitch constant from the pitch constant generator 230a along line 230. When a calculation of the product has been completed, multiplier 203 outputs a signal along line 204 to AND gate 206. The other input to AND gate 206 is the product along line 205. The output of multiplier 203 along line 204 is also applied along line 200 to reset latch 199. The signal applied along line 204 is also applied along line 211 to AND gate 212. The product output from AND gate 206 along line 207 is applied to OR gate 208 and then along line 209 to residue register 210. At this time, latch 214 is set. Thereafter, when the flag is decoded, latch 219 is set. Latch 995 is set when a line end code is decoded. Latch 219 is reset upon decode when either a column begin signal along line 29, tab code signal along line 29, carrier return signal along line 714, or column end code signal along line 29 is applied to OR gate 703. The output of OR gate 703 is along the reset line 222 to latch 219. The column end or column begin code inputs applied along line 29 to OR gate 703 are also applied to OR gate 704 and then along line 715 to AND gate 705. The other input to AND gate 705 is along line 716 from latch 219 along line 220. The output of AND gate 705 is along line 717 to OR gate 706 and then along line 718 to cause printing of the line. A tab code decoded by decode 44 and applied along line 29 to OR gate 703 will also result in latch 219 being reset. In this event though, the overall scan operation will not be terminated. It is only temporarily interrupted while the escapement for the tab is determined from the text tab rack 904. Once the tab escapement has been determined, it is applied along line 777 to AND gate 734 in FIG. 18g, and along line 707 to OR gate 700 in FIG. 18a. The output of OR gate 700 is along line 242b. Scanning then continues.

A text scan signal is applied along line 231 to AND gate 232. The other inputs to AND gate 232 are along lines 247 and 248. The input along line 247 is upon the setting of latch 253. The setting of latch 253 is upon an input along line 252. Latch 253 is reset upon an input along line 253a. The output of AND gate 232 is along line 249 to cause an incrementing of up counter 250. This incrementing is for each interword space detected during a scan of the line. The output of counter 250 is along line 250a. Counter 250 is reset along line 250b. The text scan signal is also applied along line 233 to AND gate 234. Other inputs to AND gate 234 are 1) along line 238 from OR gate 237, and 2) along line 259a from inverter 259b. The inputs to OR gate 237 are along lines 235 and 236. The input to inverter 259b is along line 259c from shift register 259. The output of AND gate 234 is along lines 239 and 240. The output along line 240 is to subtractor 241 and the output along line 239 is to a shift register delay 239a. The output of delay 239a is along line 239b. These outputs are for each character or space scanned. Subtractor 241 is used to determine the difference between the residue stored in register 210 and applied along line 244, and the escapement of the character being scanned along line 242a. The result is applied along line 254, through AND gate 255, along line 256, through OR gate 208, and along line 209 to residue register 210. When a line end code is scanned, the structure made up of decode 257, shift register 259, AND gate 246, and latch 263 causes a reading of the next character for a paragraph definition code. The line end code could be a carrier return code applied along line 258, and the paragraph definition code could consist of two carrier return codes or a required carrier return code. The input to decode 257 is along line 20.

The output of shift register 259 is along line 260 to AND gate 246. The other inputs to AND gate 246 are along line 245, and along line 261 from OR gate 261a. The inputs to OR gate 261a are along lines 261b, 261c, 261d, and 261e. The output of AND gate 246 is along line 262 to latch 263. Upon detection of a required carrier return code, a line end signal is applied along line 714 to OR gate 703. The output of OR gate 703 is along the reset line 222 to latch 219. The output of OR gate 703 along line 222 is also applied along line 225 to AND gate 221. The output of AND gate 221 is along the set line 224 to latch 995. The output of latch 995 is along line 226.

Figure 18B:
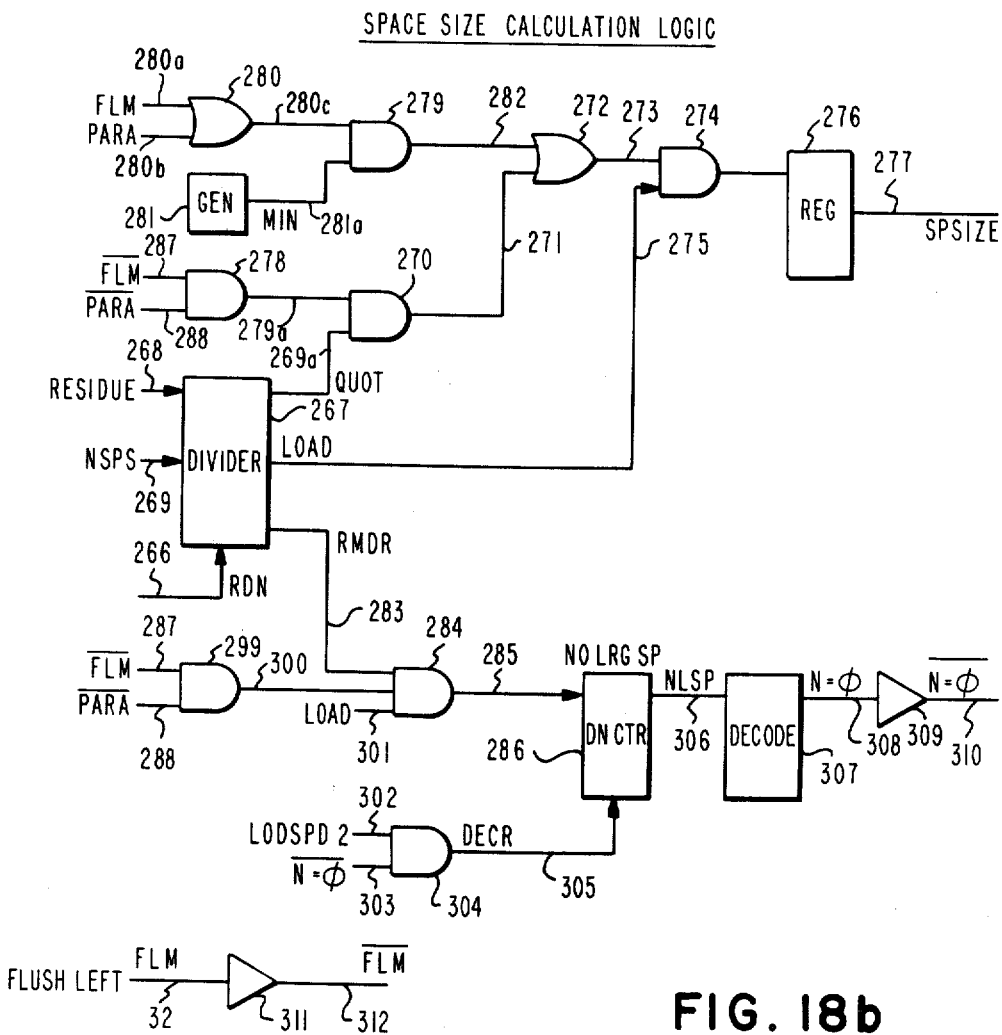

Refer next to FIG. 18b. The output of latch 995 in FIG. 18a along line 226 is also applied along line 266 to divider 267. This causes divider 267 to form a quotient of the residue applied along line 268 and the number of spaces on the line. The number of spaces is applied along line 269. The input along line 268 is from register 210 along line 244 in FIG. 18a. The divider output along line 275 is for loading the quotient applied along line 269a into space size register 276. The quotient applied along line 269a is to AND gate 270 and then along line 271 to OR gate 272. The output of OR gate 272 is along line 273 to AND gate 274. If the mode of operation is flush left along line 280a, or the line being printed is the last line of a paragraph along line 280b, an input is to OR gate 280 and then to AND gate 279 along line 280c. The output of OR gate 279 is along line 282 to OR gate 272. In this case the minimum interword space size generated by a generator 281 is applied along line 281a and gated through AND gate 279 to space size register 276. The divider 267 also forms a remainder which is output along line 283 to AND gate 284. This defines the number of output spaces that must be larger than the solution by one unit to cause justification. This number is then applied along line 285 from AND gate 284 and loaded into the number of large spaces counter 286 if operation is neither in a flush left mode or in the last line of a paragraph. Signals indicating that operation is not in a flush left mode and not in the last line of a paragraph are applied along lines 287 and 288 to AND gate 299 and AND gate 278. The output of AND gate 278 is along line 279a. The mode signal applied along line 280a is also applied along line 32 to inverter 311. The output of inverter 311 is along line 312. The output of AND gate 299 is along line 300 to AND gate 284. The remaining input to AND gate 284 is along the load line 301 from divider 267. With the number of large spaces stored in counter 286, there is a decrementing thereof each time a space is output to the printer 2 until the number of large spaces is reduced to zero. The decrementing of counter 286 is along line 305 from AND gate 304. The inputs into AND gate 304 are along lines 302 and 303. The output of counter 286 is along line 306 to decode 307 to determine if the number of large spaces is equal to zero. When the number of large spaces is equal to zero, an output is applied along line 308 to inverter 309 and then along line 310. The output line 310 is applied along line 303 to AND gate 304.

The load output of divider 267 along line 275 is applied along line 227 to reset latch 995 and along line 228 to AND gate 229 in FIG. 18a. The output of AND gate 229 is along line 229a. The result is a resetting of the scan operation performed by the multi-column control logic and playout control 45. Playout will now proceed normally until the next line end code is decoded. The inputs to AND gate 264 along lines 264a and 264b result in an output along line 265 to latch 263 for resetting latch 263.

Figure 18C:
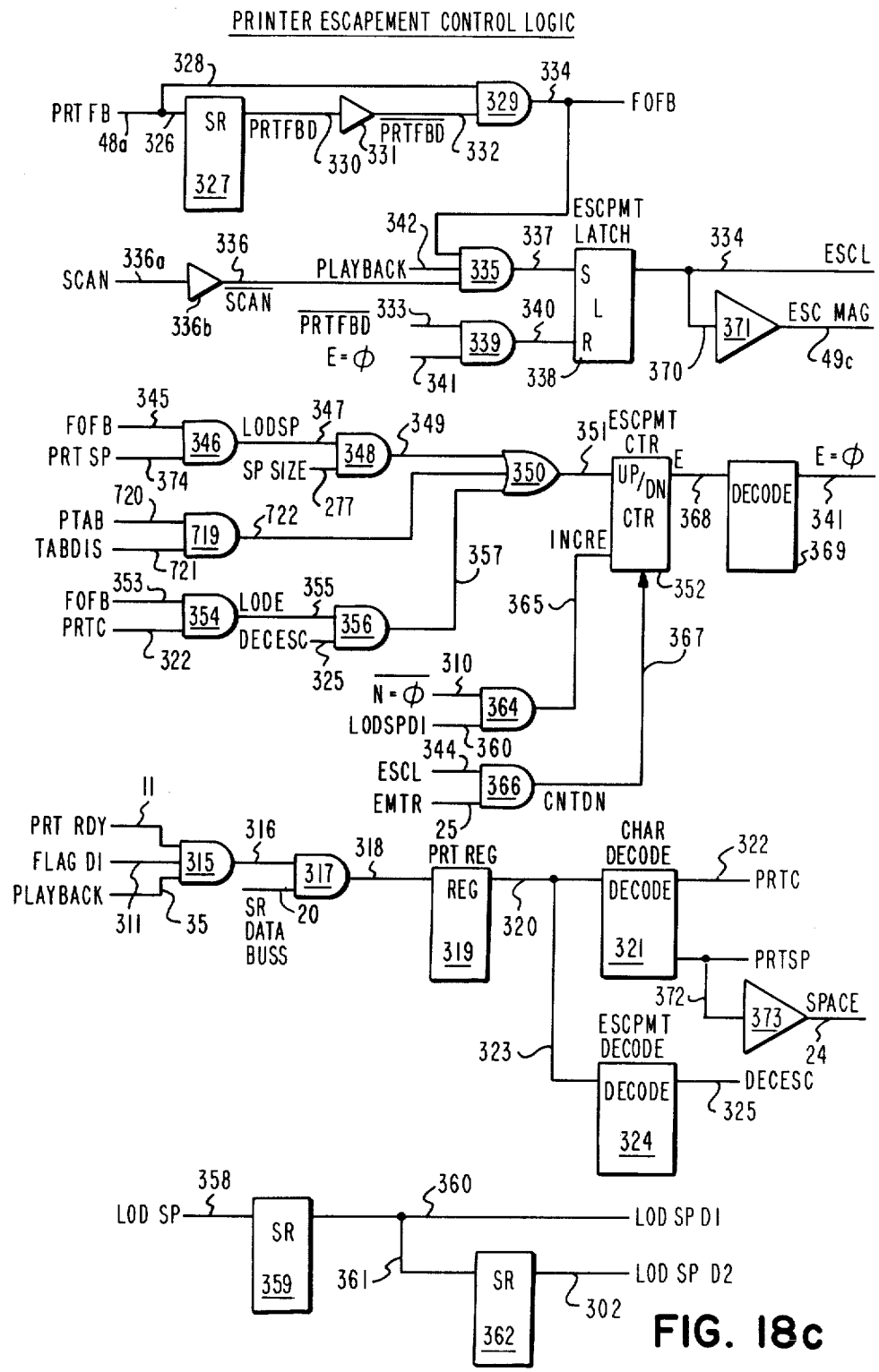
Figure 18D:
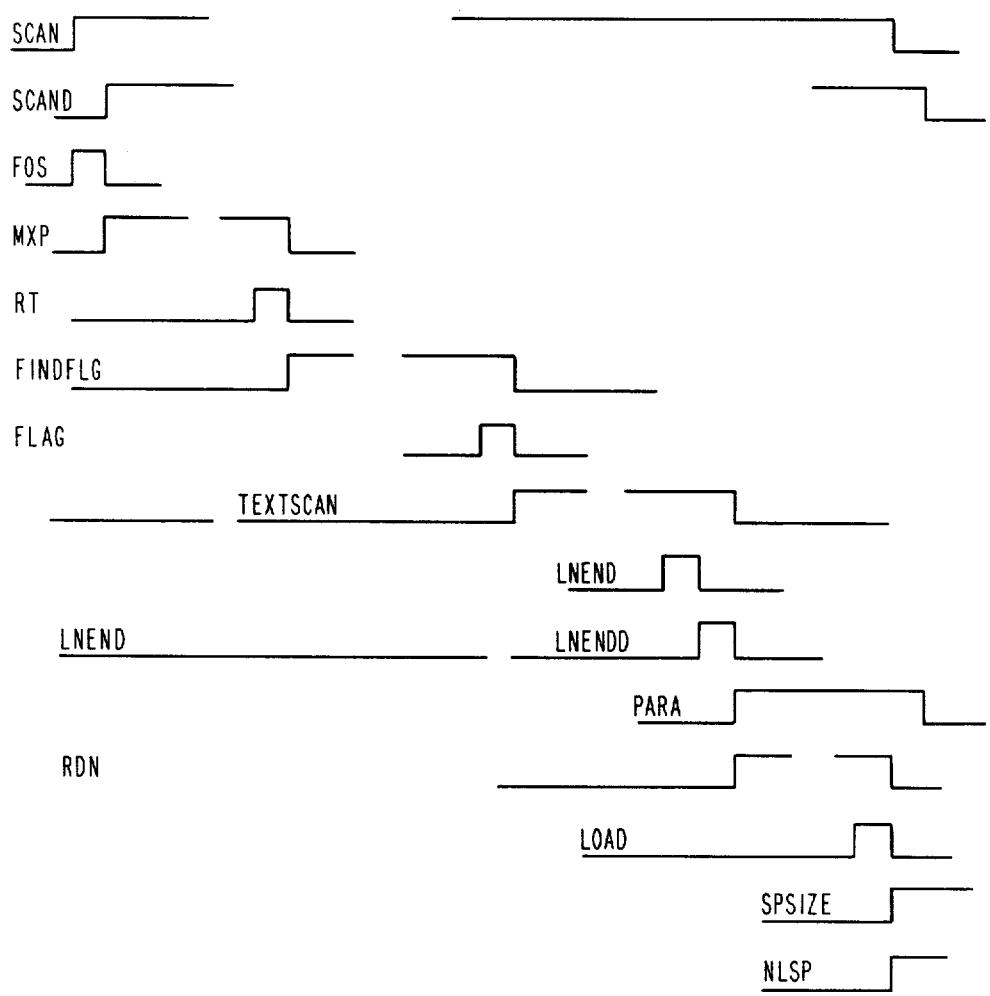
Figure 18E:
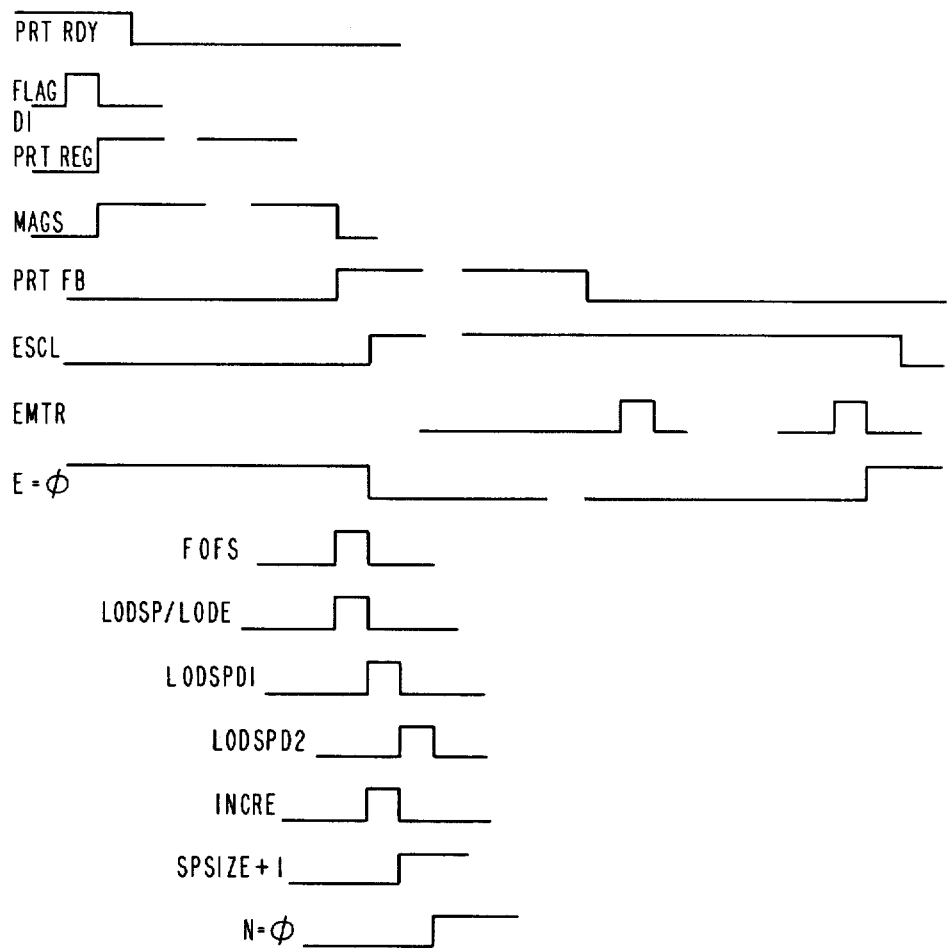

Refer next to FIG. 18d. Shown is a timing diagram for the operations performed by the structure illustrated and FIGS. 18a and 18b.

Refer next to FIG. 18c. With up signals applied along playback line 35 and printer ready line 11, the code following the flag is gated into register 319. A signal indicating the delay of the flag one bit time is applied along line 311 to AND gate 315. The output of AND gate 315 is along line 316 to AND gate 317. The other input to AND gate 317 is from the shift register data buss 20. The output of AND gate 317 is along line 318 to register 319. The output of register 319 is along line 320 to character decode 321. The outputs of decode 321 are along lines 322 and 372. The output of register 319 is also applied along line 323 to decode 324. Decode 324 decodes the escapement value for the character to be printed. The output of decode 324 is along line 325 for decrementing the residue. The output along line 322 from decode 321 is for causing the printing of a character. The output from decode 321 along line 372 is for printing a space and is also applied to driver 373. The output of driver 373 is a space along line 24.

Printer feedback along line 48a is generated by printer 2 in FIG. 14. This signal initiates a character, space, tab escapement control operation as follows. The signal applied along line 48a is also applied along line 326 to shift register delay 327 and along line 328 to AND gate 329. The output of shift register delay 327 is along line 330 to inverter 331. The delayed and inverted output of inverter 331 is along line 332 to AND gate 329. After a delay of one bit time, there is an output along line 334. The output along line 334 is applied to AND gate 335. The other inputs to AND gate 335 are playback along line 342 and NOT scan along line 336. The scan signal along line 336a is inverted by inverter 336b and then applied along line 336 to AND gate 335. The output of AND gate 335 is along line 337 to escapement latch 338. This sets escapement latch 338 if an up signal is applied along line 342 while a down signal is applied along the scan line 336a. The output of AND gate 329 along line 334 is also applied along line 345 to AND gate 346. If a space code is being printed, a signal is applied along line 374 to AND gate 346 and an output is applied along line 347 to AND gate 348. The other input to AND gate 348 is along line 277. The output of AND gate 348 is along line 349 to OR gate 350. The output along line 347 is up only if the character being printed is a space. In this case, the contents of space size register 276 in FIG. 18b are gated through OR gate 350 and along line 351 to escapement counter 352. If the character being printed is a print character, the output of character decode 321 will be along line 322 to AND gate 354. With the input to AND gate 354 along line 353 being up, an output is applied along line 355 to AND gate 356. This causes the character escapement generated by escapement decode 324 along line 325 to be gated through AND gate 356 and along line 357 to OR gate 350. The output of OR gate 350 is along line 351 as before to counter 352.

If the code to be printed is a tab, the signal TABT is received from logic and control 45. The output format control 46 then outputs a signal along line 816 from OR gate 751 in FIG. 18f. This signal is applied to the text tab rack control logic 500 to obtain the escapement for the tab. The inputs to OR gate 751 are along line 814 and 815. When escapement for the tab is received, it is applied along line 721 to AND gate 719 in FIG. 18c. The other input to AND gate 719 is along line 720. The output of AND gate 719 is along line 722 to OR gate 350 and then along line 351 to escapement counter 352.

Escapement counter 352 is an up/down counter which is incremented for each space code output to the printer 2 until the number of large spaces counter 286 in FIG. 18b has been decremented to zero. As pointed out above, the output of counter 286 in FIG. 18b is along line 306 to decode 307. Decode 307 detects when the number of large spaces is equal to zero and generates an output along line 308 to inverter 309. The inverted output of inverter 309 is along line 310 to AND gate 364 in FIG. 18c. The other input to AND gate 364 is along line 360. The output of AND gate 364 is along line 365 to escapement counter 352. The input to AND gate 364 along line 360 is from shift register 359. The input to register 359 is along line 358 and an output is applied along lines 360 and 361. Counter 286 is decremented for each space. The decrementing signal along line 305 is from AND gate 304. The input along line 302 to AND gate 304 is from shift register 362 in FIG. 18c. The other input to AND gate 304 is along lines 310 and 303. As shown in the timing diagram of FIG. 18e, printer 2 outputs emitter pulses after outputting a printer feedback signal. The emitter pulses are associated with escapement and are applied along line 25 to AND gate 366. The other input to AND gate 366 is along line 344. The output of AND gate 366 is along line 367 for decrementing counter 352. The output of counter 352 is along line 368 to decode 369. The output of decode 369 is along line 341 when the contents of counter 352 are equal to zero. The output along line 341 is applied to AND gate 339. The other input to AND gate 339 is along line 333. The output along line 340 from AND gate 339 is for resetting latch 338. When latch 338 is reset, a down signal is applied along line 334 and line 370 to driver 371. The output of driver 371 is along line 49c for causing the printer 2 to cease escaping.

Figure 18F:
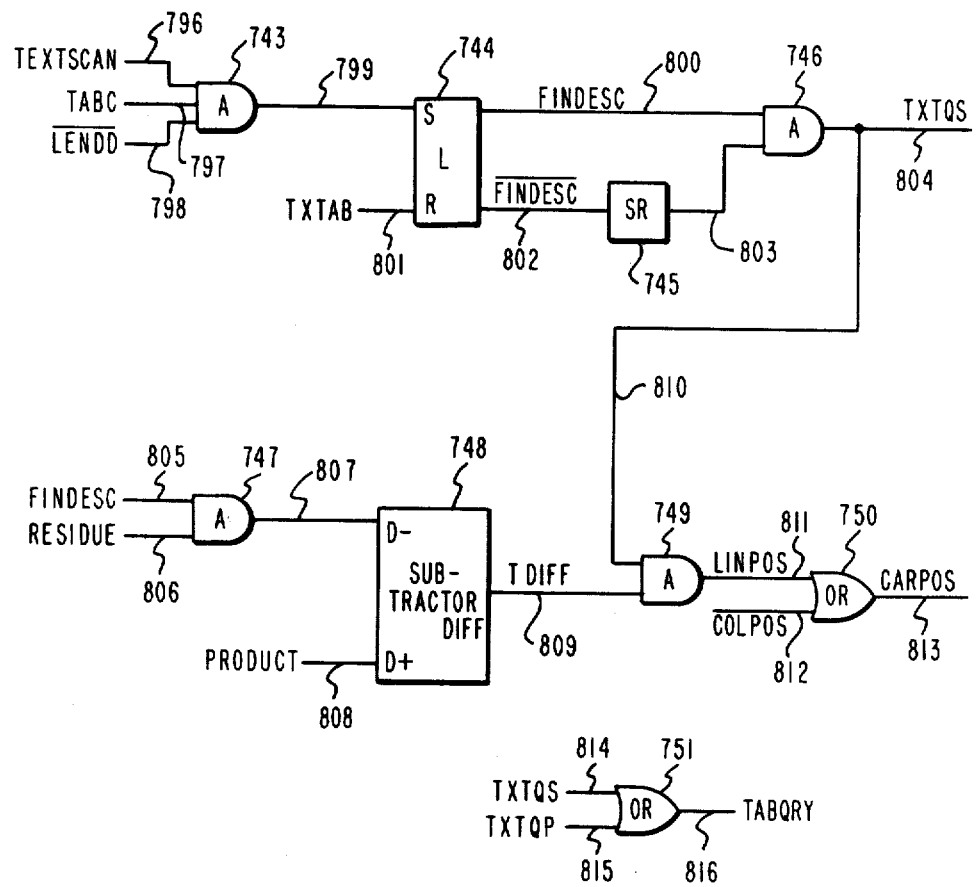
Figure 18G:
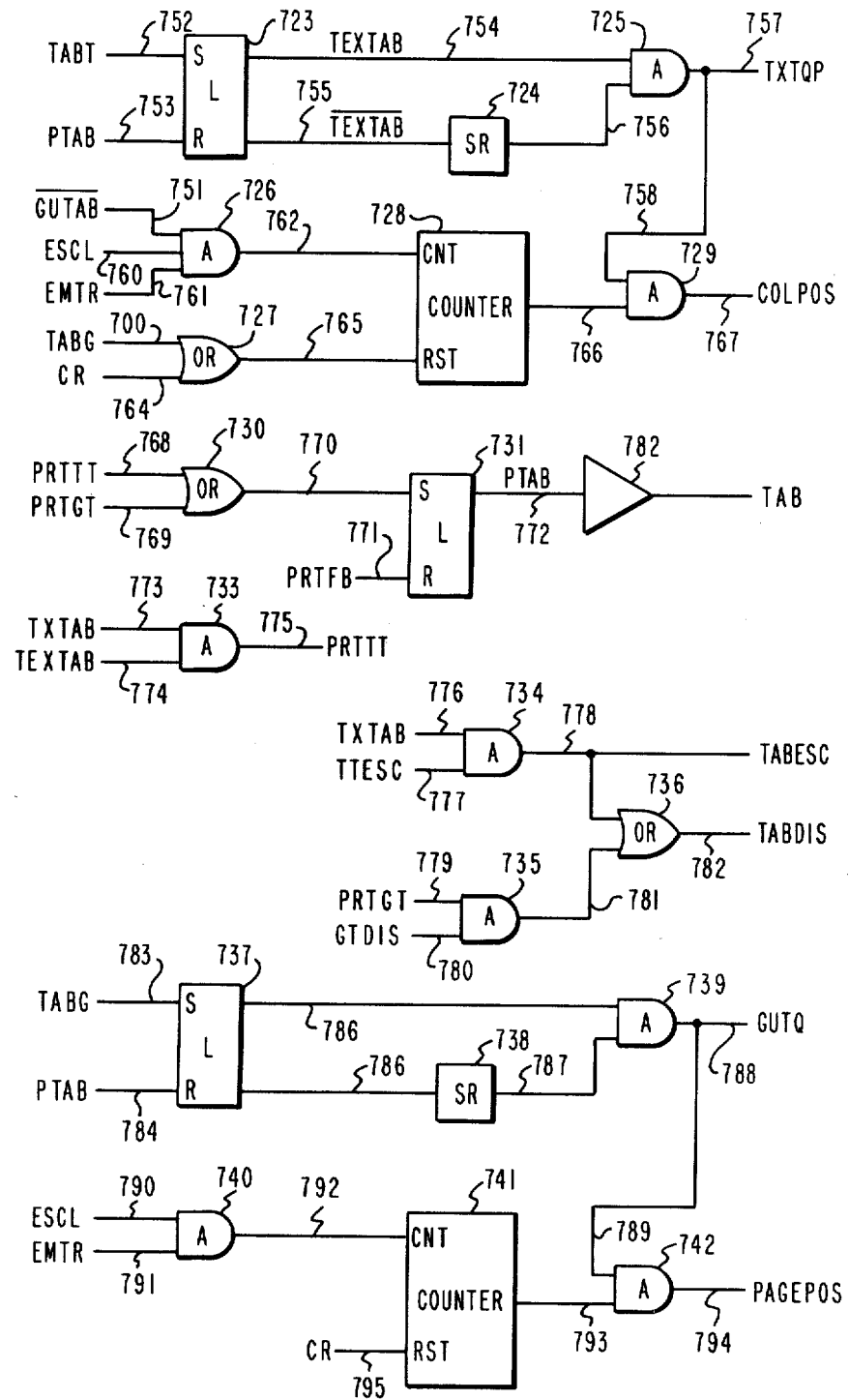

Refer next to FIGS. 18f and 18g. Shown is the structure included in output format control 46 for interfacing with the next tab rack control logic 500 and column tab rack control logic 501 shown in FIG. 14.

When a tab code is detected during a scan operation for a line and a paragraph definition check is not involved, an output is applied along line 799 from AND gate 743 to set latch 744. The inputs to AND gate 743 are along lines 796, 797, and 798. The output of latch 744 along line 800 is applied along line 805 to AND gate 747. This is for gating the residue applied along line 806 along line 807 to subtracter 748. The output of latch 744 along line 800 is applied to AND gate 746. The other input to AND gate 746 is along line 803 from shift register delay 745. Upon an input to latch 744 along line 801, latch 744 is reset, and an output is applied along line 802 to delay 745. Another input to subtractor 748 is the product from multiplier 203 in FIG. 18a along lines 205 and 808. In subtracter 748 the residue is subtracted from the measure (product). The difference in escapement units is applied along line 809 to AND gate 749. The other input to AND gate 749 is from AND gate 746 along line 810. The output along line 809 is the carrier distance from the left margin of the column. This is accumulated due to the scan operation. The output of AND gate 746 along line 804 is also applied along line 814 to OR gate 751. This signal is used to gate both the line position (carrier position) and an address signal to the text tab rack control logic 500. The output of AND gate 749 is along line 811 to OR gate 750. The output of OR gate 750 is along line 813. Another input to OR gate 750 is along line 812. The structure thus described is for addressing the text tab rack control logic 500 with the carrier position. Logic 500 then outputs back the distance to the next tab stop. The distance to the next tab stop is applied along line 777 to AND gate 734 in FIG. 18g. The other input to AND gate 734 is along line 776. This input along line 776 is when a tab escapement is present on line 777. The escapement value applied along line 777 is then gated along line 778 to line 707 in FIG. 18a. The information appearing on line 707 is applied to OR gate 700 and then along line 242. Another input to OR gate 700 is along line 243. The information appearing on line 242 is applied along line 242a to subtracter 241. This operation is initiated by the output of AND gate 701 along lines 710 and 240 to subtracter 241. The inputs to AND gate 701 are along lines 708 and 709. The output of AND gate 701 along line 710 is also applied along line 711 to OR gate 702.

When a tab is decoded during printout, a signal is applied along line 752 in FIG. 18c from logic and control 45 to set latch 723. The output of latch 723 is applied along line 754 to AND gate 725. The other input to AND gate 725 is from shift register delay 724 along line 756. Resetting of latch 731 occurs upon a signal applied along line 771. The output of AND gate 725 is along line 758 to AND gate 729 and along line 757. Another input to AND gate 729 is along line 766 from resettable up-counter 728. The output from AND gate 729 along line 767 is the carrier position with respect to the left margin of the column being printed and is used to address the text tab rack control logic 500. The carrier position is continuously updated by counter 728. As the carrier 2a escapes, signals are applied along line 762 to increment counter 728. The signals applied along line 762 are emitter pulses from the printer 2 along line 761 to AND gate 726. Another input to AND gate 726 is from the escapement latch 2e and along line 760. The remaining input to AND gate 726 is along line 751. Counter 728 is reset when either a carrier return is decoded and applied along line 764 or a column tab operation is decoded and applied along line 700 to OR gate 727. The output of OR gate 727 is along the reset line 765. The addressing of the text tab rack 904 occurs when the output of AND gate 725 is applied along line 815 to OR gate 751 in FIG. 18f. The output of AND gate 729 along line 767 is applied along line 812 to OR gate 750. The output of OR gate 750 is along line 813 for addressing the text tab rack control logic 500.

When the escapement to the next tab stop has been determined by an output from the text tab rack control logic 500, an input along line 776 is applied to AND gate 734. The other input to AND gate 734 is the tab escapement along line 777. This input is for the escapement to the next tab stop. The output of AND gate 734 is along line 778 to OR gate 736. The output of OR gate 736 is along line 782. Since latch 723 is set, a signal is applied along line 774 to AND gate 733. The other input to AND gate 733 is along line 773. The output of AND gate 733 is along line 775. The output along line 775 is applied along line 768 to OR gate 730. Another input to OR gate 730 when appropriate is along line 769. The output of OR gate 730 due to the input along line 768 is along 770 to set latch 731. Resetting of latch 731 occurs upon a signal applied along line 771. When latch 731 is set, a signal is applied along line 772 to driver 782. The output of driver 782 causes the printer 2 to begin escaping for the tab. Escapement pulses are output from the printer 2 and when a print feedback signal is received from the printer 2 the tab magnets are no longer driven and the escapement is complete.

The performance of a column tab operation is similar to the text tab operation described above. A TABG signal is applied from logic and control 45 to latch 737 along the set line 783. An output is then applied along line 786 to AND gate 739. Latch 737 is reset upon an input applied along line 784. When latch 737 is reset, an output is applied along line 786 to shift register delay 738. The output of delay 738 is then applied along line 787 to AND gate 739. The output of AND gate 739 is along line 788, and line 789 to AND gate 742. The addressing of the column tab rack 922 is along line 788, and line 794 which is the page position of the carrier 2a. For column tabs, the carrier position is referenced with respect to the left margin of the page. This is determined by counter 741. The input to counter 741 is along line 792 from AND gate 740. The output of counter 741 is along line 793 to AND gate 742. The inputs to AND gate 740 are along lines 790 and 791. Counter 741 is incremented for each emitter pulse received from the printer 2 for all escapements from the left margin of the page. Counter 741 is reset along line 795 only when a carrier return causes the print position to be repositioned to the beginning of the first column. Upon addressing the column tab rack control logic 501, the distance to the column tab is output and applied along line 780 to AND gate 735. The other input to AND gate 735 is along line 779. The output of AND gate 735 is along line 781, through OR gate 736, and along line 782 to the printer 2 to cause escapement. Latch 731 is again set and the output is to the printer 2.

Figure 19A:
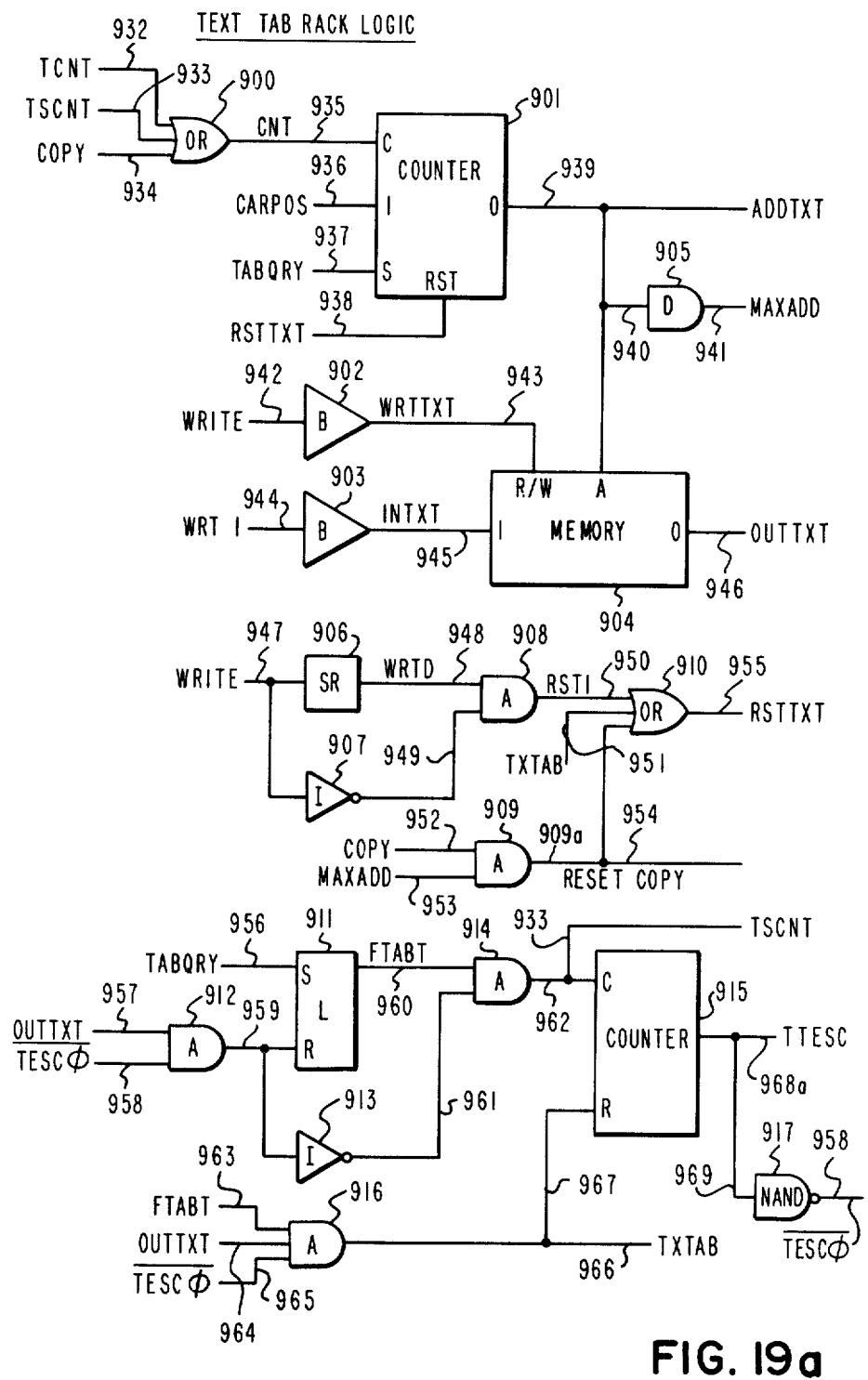
FIGS. 19a and b illustrate the structure included in the text tab rack control logic and column tab rack control logic of FIG. 14.
Figure 19B:
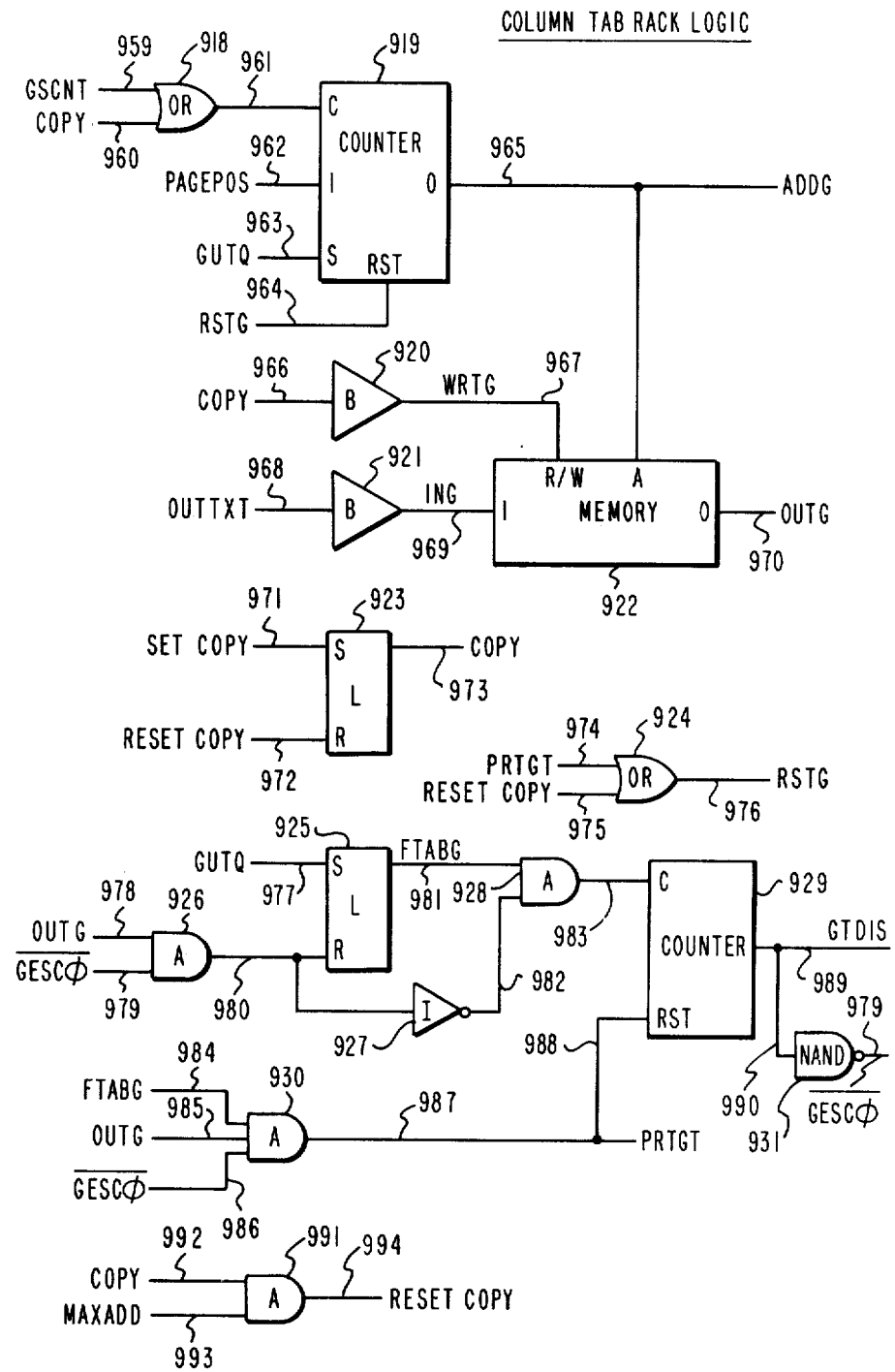

Refer next to FIGS. 19a and 19b for the structure included in the text tab rack control logic 500 and the column tab rack control logic 501 shown in FIG. 14. When a tab format line is encountered in memory 19 during playout, logic and control 45 outputs signals along lines 932, 942, and 944. These signals cause tabs to be set in the test tab rack 904. The input along line 932 is applied to OR gate 900 and then along line 935 to counter 901. The output of counter 901 is along line 939 to address text tab rack 904. Test tab rack 904 is a random access memory in the preferred embodiment. The input along line 942 is to buffer 902 and then along line 943 to rack 904. Line 943 is the read/write line. The input along line 944 is to buffer 903 and then along line 945 to rack 904. Buffers 902 and 903 serve as level converters.

When text tab rack control logic 500 is addressed for a text tab escapement, a signal is applied along line 937 and the carrier position is loaded into counter 901. This is along line 936 and determines the memory address along line 939 corresponding to the carrier distance from the left margin of the column. At the same time, latch 911 is set along line 956. Counter 901 is incremented along line 935 due to an input along line 933 to OR gate 900. The output of latch 911 is along line 960 to AND gate 914. The output of AND gate 914 is along line 962 for incrementing counter 915 from zero. This continues until a tab position is reached. The output of tab rack 904 along line 946 will be when a tab stop is reached. This will cause an input to AND gate 912 along line 957 for resetting latch 911. The output of AND gate 912 is along line 959. At this same time, inputs along line 963, 964, and 965 to AND gate 915 cause an output to be applied along line 966 to output format control 46. The contents of counter 915 are output along line 968a and this is the distance to be escaped. The output of counter 915 is also applied along line 969 to NAND gate 917 and then along line 958. The output along line 958 is applied to AND gate 916 and AND gate 912. The output along line 958 to AND gate 916 is along line 965 and to AND gate 912 along line 958. The other input to AND gate 912 is along line 957 and the other inputs to AND gate 916 are along lines 963 and 964. The output of AND gate 912 is along line 959 to reset latch 911 and to inverter 913. The output of inverter 913 is along line 961 to AND gate 914. The output of AND gate 916 is along line 967 to reset resettable up-counter 915. If the carrier position used for addressing the test tab rack 914 corresponds to a tab stop, the text tab rack 904 would immediately have an output along line 946 and there would be no counting for the next tab stop. This is prevented by the TESC$\phi$ inputs to gates 912 and 916.

The copy input along line 934 to OR gate 900 and the decode of the contents of counter 901 along lines 939 and 940 by decode 905 are obtained when a copy of the contents of the text tab rack 904 are transferred to the column tab rack 922 in FIG. 19b. The signal along line 934 is obtained from the column tab rack control logic 501. The decode along line 941 and the output of rack 904 along line 946 are applied to the column tab rack control logic 501. This is initiated by logic and control 45 when a set copy signal is applied along line 971 to latch 923 in FIG. 19b. When latch 923 is set, an output is applied along line 973 and line 934 to OR gate 900. Operation continues until the maximum address of the rack 904 is reached. The decode of the maximum address of rack 904 is along line 941 in FIG. 19a. During the advance for the maximum address, the column tab rack 922 is loaded with the contents of the text tab rack 904. Rack 922 is also a random access memory.

Counter 901 is reset upon an input thereto along lines 955 and 938 from OR gate 910. When a write signal is applied along line 942, it is also applied along line 947 to shift register delay 906. The output of delay 906 is along line 948 to AND gate 908. After a delay of one bit time and the write signal along line 947 being driven down, an up output from inverter 907 is applied along line 949 to AND gate 908. The output from AND gate 908 is along line 950 to OR gate 910. The output of OR gate 910 is along line 955. Other inputs to OR gate 910 are along line 951 from AND gate 916, and line 909a from AND gate 909. The inputs to AND gate 909 are along line 952 when a copy signal is applied along line 934, and along line 953 from line 941. The output of AND gate 909 is along lines 909a and 954.

The structure set out in FIG. 19b, on the whole, is very similar to that illustrated in FIG. 19a. The address of the column tab rack control logic 501 for the escapement value or escapement distance to the next column tab is along line 963 to counter 919. The carrier position is input to counter 919 along line 962. The input applied along line 963 is also applied along line 977 to latch 925. When latch 925 is set, an output is applied along line 981 to AND gate 928. The output of AND gate 928 is along line 983 to counter 929. The output of counter 929 is along lines 989 and 990. The output along line 990 is to NAND gate 931 and an output is applied along line 979. The output along line 979 is also applied along line 986 to AND gate 930. The other input to AND gate 928 is along line 982 from inverter 927. The input to inverter 927 is derived from inputs along lines 978 and 979 to AND gate 926. The output of AND gate 926 is along line 980.

Other inputs to counter 919 are along line 961 from OR gate 918, and along line 964. The input along line 961 depends upon inputs along lines 959 or 960 to OR gate 918. The output of counter 919 is along line 965 to column tab rack 922. Other inputs to column tab rack 922 are derived from inputs along lines 966 and 968. The input along line 966 is to buffer 920 and then along line 967 to tab rack 922. The input along line 968 is to buffer 921 and then along line 969 to tab rack 922. Buffers 920 and 921 serve as level converters. The reset line for latch 923 is along line 972. The input along line 960 to OR gate 918 is also applied along line 992 to AND gate 991. The other input to AND gate 991 is along line 993. The output of AND gate 991 is along lines 994 and 975 to OR gate 924. Another input to OR gate 924 is along line 974. The output of OR gate 924 is along line 976. The carrier position applied along line 962 to counter 919 is the position of the carrier 2a relative to the left margin of the page. The address counter 919 is loaded with this value and then incremented until a column tab stop is detected and an output is applied along 970 from rack 922. Counter 929 accumulates the necessary escapement for the carrier 2a and outputs this escapement along line 989 to output format control 46. The output of AND gate 930 along line 987 is applied along line 988 to reset counter 929. This occurs upon completion of the operation. The other inputs to AND gate 930 are along lines 981 and 984 from latch 925, and along lines 970 and 985 from rack 922.

In summary, a system is provided having basically a keyboard 1, a printer 2, a buffer 19 a buffer control 17, a multicolumn playout control 45, an output format control 46, and two electronic tab racks 904 and 922. During input keying, a beginning of memory code is stored in the buffer 19. Prior to input keying of columns, a tab format line, including tabs for defining the left margins of each column after the first, is keyed and stored in the buffer 19 and tab stops are set in a text tab rack 904. This is if a tab format line has not already been keyed for controlling following columns. The beginning of the first column is then defined by keying and storing a column begin code. Another tab format line is keyed and stored to control following text. Tab stops in the text tab rack 904 are updated in accordance with this format line. Thereafter, column mode and measure codes are keyed. If subsequent columns or sections of columns are to have different modes or measures, additional mode and measure codes will be keyed and stored along with the columns concerned. Following the keying and storage of mode and measure codes, the text for the first column is keyed and stored in its entirety. For each subsequent column, a column begin code is keyed and stored, and followed by any necessary mode and measure codes and the column text. At the end of the last column to be printed out in side-by-side relationship, a column end code is keyed and stored in the buffer 19. During later playout when the first stored tab format line is encountered during a buffer memory scan operation, tab stops defined thereby are set in the text tab rack 904. When a column begin code is encountered, a copy of the contents of the test tab rack 904 are automatically transferred to a column tab rack 922. When the format line following the column begin code is encountered, the text tab rack 904 is updated and tab stops defined thereby are set in the text tab rack 904 to control text within the columns. The tab stops set in the column tab rack 922 control the left margin locations of each column after the first. An operation flag is inserted into the buffer memory 19 after the first column begin code. The memory scan operation continues and after each column begin code except the first, a column marker code is inserted into memory 19 and scanning continues. Upon detection of the column end code, scanning continues to the beginning of memory 19. When the operation flag is again detected, following characters and spaces are printed out in the defined mode until a carrier return is detected. If any tab codes are encountered during the playout prior to detection of a carrier return code, the printer carrier 2a is caused to escape for the tab. The text tab rack 904 is addressed for the tab escapement. Once the carrier return code is encountered and there exists a subsequent column, the printer carrier 2a is caused to escape through tabbing rather than return to the left margin. For this tab operation the column tab rack 922 is addressed for the tab escapement. The left margin of the page is utilized as a reference in determining escapement for a column tab operation during playout. For a text tab operation during playout, the left margin of the column being printed is utilized as a reference in determining escapement. After the column tab operation, a column advance operation is performed. A column marker code is written over the operation flag, and the memory 19 is scanned. The next detected column marker code is written over with a new operation flag. Printout then continues until a carrier return code is detected. If this carrier return is in the last column, the carrier 2a is returned to the left margin and a column advance operation is performed to advance to the first column. The printout and column advance operations continue until all text from all columns has been printed. After printout of all columns, the column marker codes are flushed from memory 19.

From the above, format lines can be keyed and stored with the text during input keying. This will result in the text tab rack 904 being updated for each format line. Also, playout can be interrupted for keying and setting of tabs in the text tab rack 904. Further, the text tab rack 904 will be updated upon reading a format line from memory 19 during playout. The loading of the column tab rack 922 is by the system upon encountering the first column begin code during playout.

While the invention has been particularly shown and described with reference to a particular embodiment, it will be understood by those skilled in the art that various changes in form and detail may be made without departing from the spirit and scope of the invention.

What is claimed is:

1. A tabulation system for controlling printout of corresponding lines of sequentially stored columns during playout to form a side-by-side format, said system comprising:
    (a) a first tab storage means for storing tab locations defined before the beginning of the first of said columns to control text positioning during playout;
    (b) a second tab storage means for storing a copy of said tab locations stored in said first tab storage means to control column positioning during playout of said columns; and
    (c) means for causing said copy to be stored in said second tab storage means when said beginning of said first column is reached during playout.

2. A system according to claim 1 including means for inputting tabs into said system for storage in said first tab storage means after said copy has been stored in said second tab storage means to control text positioning during playout of said columns.

3. A system according to claim 2 including means for causing said first tab storage means to be addressed for tab escapement before the end of one of said corresponding lines if reached during playout.

4. A system according to claim 3 including means for causing said second tab storage means to be addressed for tab escapement when the end of one of said corresponding lines is reached during playout.

5. A system according to claim 4 including means for determining a current printing position during playout.

6. A system according to claim 5 including means for calculating escapement from the left margin of the column being played out to the next printing position based on said current printing position when said first tab storage means is addressed.

7. A system according to claim 6 including means for calculating escapement from the current printing position to the next printing position based on escapement from the left margin of said first column when said second tab storage means is addressed.

8. A system according to claim 7 including means for causing escapement to said next printing position following said addressing of said first tab storge means.

9. A system according to claim 8 including means for causing escapement to said next printing position following said addressing of said second tab storage means.

10. A system according to claim 9 including means for repositioning the printing position to said left margin of said first column when the end of a line in the last of said columns is reached.

* * * * *